US006990448B2

(12) United States Patent
Charlesworth et al.

(10) Patent No.: US 6,990,448 B2
(45) Date of Patent: Jan. 24, 2006

(54) DATABASE ANNOTATION AND RETRIEVAL INCLUDING PHONEME DATA

(75) Inventors: Jason Peter Andrew Charlesworth, Guildford (GB); Philip Neil Garner, Guildford (GB); Jebu Jacob Rajan, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,799

(22) Filed: Aug. 23, 2001

(65) Prior Publication Data

US 2002/0052740 A1 May 2, 2002

Related U.S. Application Data

(63) Continuation of application No. PCT/GB00/00718, filed on Mar. 1, 2000.

(30) Foreign Application Priority Data

| Mar. 5, 1999 | (GB) | ............................................. 9905160 |
| Mar. 5, 1999 | (GB) | ............................................. 9905186 |
| Mar. 5, 1999 | (GB) | ............................................. 9905187 |
| Mar. 5, 1999 | (GB) | ............................................. 9905199 |
| Mar. 5, 1999 | (GB) | ............................................. 9905201 |

(51) Int. Cl.
*G10L 17/00* (2006.01)
*G10L 17/30* (2006.01)

(52) U.S. Cl. ........................................ 704/243; 704/9

(58) Field of Classification Search ................ 704/243, 704/240, 259, 255, 270, 256, 9; 707/5
See application file for complete search history.

(56) References Cited

U.S. PATENT DOCUMENTS

| 4,227,176 A | * | 10/1980 | Moshier ...................... 704/231 |
| 4,736,429 A | | 4/1988 | Niyada et al. ................ 381/43 |
| 4,903,305 A | | 2/1990 | Gillick et al. ................. 381/41 |
| 4,975,959 A | | 12/1990 | Benbassat .................... 381/41 |
| 4,980,918 A | * | 12/1990 | Bahl et al. ................... 704/240 |
| 4,985,924 A | | 1/1991 | Matsuura ..................... 381/43 |
| 5,075,896 A | | 12/1991 | Wilcox et al. ............... 382/39 |
| 5,131,043 A | | 7/1992 | Fujii et al. ................... 381/41 |
| 5,136,655 A | * | 8/1992 | Bronson ...................... 704/270 |
| 5,202,952 A | | 4/1993 | Gillick et al. ................. 395/2 |
| 5,333,275 A | | 7/1994 | Wheatley et al. .......... 395/2.52 |
| 5,390,278 A | | 2/1995 | Gupta et al. ............... 395/2.52 |
| 5,500,920 A | * | 3/1996 | Kupiec ...................... 704/270.1 |
| 5,577,249 A | | 11/1996 | Califano ...................... 707/100 |
| 5,594,641 A | * | 1/1997 | Kaplan et al. ................. 707/1 |
| 5,638,425 A | * | 6/1997 | Meador et al. .......... 379/88.01 |
| 5,640,487 A | | 6/1997 | Lau et al. ................... 395/2.52 |
| 5,649,060 A | * | 7/1997 | Ellozy et al. ............... 704/278 |
| 5,675,706 A | | 10/1997 | Lee et al. ................... 395/2.65 |
| 5,680,605 A | | 10/1997 | Torres ........................ 395/603 |
| 5,684,925 A | | 11/1997 | Morin et al. ................ 395/2.63 |
| 5,708,759 A | | 1/1998 | Kemeny ..................... 395/2.63 |
| 5,721,939 A | * | 2/1998 | Kaplan ......................... 704/9 |
| 5,729,741 A | * | 3/1998 | Liaguno et al. .......... 707/104.1 |
| 5,737,489 A | | 4/1998 | Chou et al. ................ 395/2.65 |
| 5,737,723 A | | 4/1998 | Riley et al. ................. 704/243 |
| 5,752,227 A | | 5/1998 | Lyberg ....................... 704/235 |
| 5,781,884 A | * | 7/1998 | Pereira et al. .............. 704/260 |
| 5,787,414 A | * | 7/1998 | Miike et al. .................... 707/2 |
| 5,799,267 A | | 8/1998 | Siegel ........................... 704/1 |
| 5,835,667 A | | 11/1998 | Wactlar et al. ................. 386/96 |
| 5,852,822 A | | 12/1998 | Srinivasan et al. ............. 707/4 |
| 5,870,740 A | * | 2/1999 | Rose et al. .................... 707/5 |
| 5,873,061 A | | 2/1999 | Häb-Umbach et al. ..... 704/254 |
| 5,907,821 A | | 5/1999 | Kaji et al. ..................... 704/4 |
| 5,983,177 A | | 11/1999 | Wu et al. .................... 704/244 |
| 5,999,902 A | | 12/1999 | Scahill et al. ............... 704/240 |
| 6,023,536 A | | 2/2000 | Visser ........................ 382/310 |
| 6,026,398 A | | 2/2000 | Brown et al. .................. 707/5 |
| 6,061,679 A | | 5/2000 | Bournas et al. ................ 707/3 |
| 6,070,140 A | | 5/2000 | Tran | |
| 6,122,613 A | | 9/2000 | Baker | |
| 6,172,675 B1 | * | 1/2001 | Ahmad et al. ........... 715/500.1 |
| 6,182,039 B1 | | 1/2001 | Rigazio et al. ............. 704/257 |
| 6,192,337 B1 | | 2/2001 | Ittycheriah et al. ......... 704/231 |
| 6,236,964 B1 | | 5/2001 | Tamura et al. ............. 704/254 |

| | | | |
|---|---|---|---|
| 6,243,680 B1 | 6/2001 | Gupta et al. | 704/260 |
| 6,272,242 B1 | 8/2001 | Saitoh et al. | 382/187 |
| 6,289,140 B1 | 9/2001 | Oliver | |
| 6,314,400 B1 | 11/2001 | Klakow | 704/257 |
| 6,321,226 B1 * | 11/2001 | Garber et al. | 707/10 |
| 6,389,395 B1 | 5/2002 | Ringland | 704/254 |
| 6,463,413 B1 | 10/2002 | Applebaum et al. | |
| 6,487,532 B1 | 11/2002 | Schoofs et al. | 704/251 |
| 6,490,563 B2 | 12/2002 | Hon et al. | 704/260 |
| 6,535,850 B1 | 3/2003 | Bayya | 704/239 |
| 6,567,778 B1 | 5/2003 | Chao Chang et al. | 704/257 |
| 6,567,816 B1 | 5/2003 | Desai et al. | 707/102 |
| 6,662,180 B1 | 12/2003 | Aref et al. | 707/6 |

FOREIGN PATENT DOCUMENTS

| | | | | |
|---|---|---|---|---|
| EP | 0 597 798 A1 | 5/1994 | | 704/200 |
| EP | 0 649 144 A1 | 4/1995 | | 704/278 |
| EP | 0 689 153 A2 | 12/1995 | | |
| EP | 0 789 349 A2 | 8/1997 | | |
| EP | 0 849 723 A2 | 6/1998 | | |
| GB | 2 302 199 A | 1/1997 | | |
| GB | 2 331 816 A | 6/1999 | | 707/5 |
| GB | 2 349 260 A | 10/2000 | | |
| WO | WO 98/47084 | 10/1998 | | 345/302 |
| WO | WO 99/05681 | 2/1999 | | 382/305 |
| WO | WO 00/31723 | 6/2000 | | |
| WO | WO 00/54168 | 9/2000 | | |

OTHER PUBLICATIONS

D. A. James and S. J. Young, "A Fast Lattice–Based Approach to Vocabulary Independent Wordspotting," 1994 IEEE Int. Conf. on Acoustics, Speech, and Sig. Proc., 1994. ICASSP–94. Apr. 19–22, 1994, vol. 1, pp. 1/377–1/380.*

Philippe Gelin and Chris J. Wellekens, "Keyword Spotting for Video Soundtrack Indexing,"1996 IEEE Int. Conf. on Acoustics, Speech, and Sig. Proc., 1996. ICASSP–96. Conference Proceedings. vol. 1, pp. 299–302, May 7–10, 1996.*

Justin Zobel and Philip Dart, "Phonetic String Matching: Lessons from Information Retrieval," SIGIR Forum, Assoc. for Computing Machinery, New York, 1996, pp. 166–172.*

C. Gagnoulet, et al., "MAIRIEVOX: A Voice–Activated Information System," Speech Communication vol. 10, No. 1, pp. 23–31 (Feb. 1991).

R. Haeb–Umbach, et al., "Automatic transcription of unknown words in a speech recognition system," International Conference on Acoustics, Speech, and Signal Processing, Detroit, Michigan, vol. 1, pp. 840–843 (May 9–12, 1995).

Shiel et al., "The Partitur Format at BAS," in Proc. of the First International Conference on Language Resources and Evaluation, Granada, Spain, 1998, 7 pages.

R. Haeb–Umbach, et al., "Automatic transcription of unknown words in a speech recognition system," International Conference on Acoustics, Speech, and Signal Processing, Detroit, Michigan, vol. 1, (May 9–12, 1995), pp. 840, 842, 843.

S. Cassidy et al., "EMU: an Enhanced Hierarchical Speech Data Management System," Proc. of the 6th Australian Speech Science and Technology Conference, Adelaide, pp. 381–386 (1996).

C. Gagnoulet, et al., "MARIEVOX: A Voice–Activated Information System," Speech Communication vol. 10, No. 1, (Feb. 1991), pp. 23, 24, 25, 31.

K. Ng et al., "Phonetic Recognition for Spoken Document Retrieval," ICASSP (1998), 4 pages.

K. Ng et al., "Subword Unit Representations for Spoken Document Retrieval," Eurospeech (1997), 4 pages.

K. Ng, "Survey of Approaches to Information Retrieval of Speech Messages," pp. 1–34 (Feb. 16, 1996).

M.J. Witbrock et al., "Using Words and Phonetic Strings for Efficient Information Retrieval from Imperfectly Transcribed Spoken Documents," XP–002146047 (1997), 4 pages.

D. Sankoff, et al., Time Warps, String Edits, and Macro Molecules: The Theory And Practice of Sequence Comparison, p. 1–44, 211–214, 311–321, and 359–362 (1983).

C. Berge, "Graphs and Hypergraphs," XP–002192893 (1976), 1 page.

M. Rahim, "A Neural Tree Network for Phoneme Classification with Experiments on the TIMIT Database," IEEE, pp. 345–348 (1992).

S. Okawa, et al., "Automatic Training of Phoneme Dictionary Based on Mutual Information Criterion," IEEE, pp. 241–244 (1994).

C. Gerber, "A General Approach to Speech Recognition," Proceedings of the Final Workshop on Multimedia Information Retrieval (Miro '95), Glasgow, Scotland, pp. 0–12 (Sep. 18–20, 1995).

Schmid, et al., "Automatically Generated Word Pronunciations from Phoneme Classifier Output", IEEE, pp. 223–226 (1993).

Skilling, John, "Maximum Entropy and Bayesian Methods", Fundamental Theories of Physics, pp. 45–52 (1988).

"Template Averaging for Adapting a Dynamic Time Warping Speech Recognizer", IBM Technical Disclosure Bulletin, vol. 32, No. 11, pp. 422–426 (Apr. 1990).

Jain, et al., "Creating Speaker–Specific Phonetic Templates with a Speaker–Independent Phonetic Recognizer: Implications for Voice Dialing", IEEE, pp. 881–884 (1996).

Bahl, et al., "A Method for the Construction of Acoustic Markov Models for Words", Speech and Audio Processing, IEEE Transactions on Speech and Audio Processing, vol. 1, Issue 4, pp. 443–452 ((Oct. 1993).

Markowitz, Judith A., "Using Speech Recognition", p. 221 (1996).

Srinivasan, et al., "Phonetic Confusion Matrix Based Spoken Document Retrieval", Annual ACM Conference on Research and Development in Information Retrieval, pp. 81–87 (Jul. 24–28, 2000).

Lee, Kai–Fu, "Automatic Speech Recognition: The Development of the SPHINX System", pp. 28–29 (1989).

"Content–Based Classification Search, and Retrieval of Audio" Wold, et al., IEEE Multimedia, vol. 3, No. 3, 1996, pp. 27–36.

Petteri Jokinen, et al., A Comparison of Approximate String Matching Algorithms, *Practice and Experience*, vol. 26(12), 1439–1458 (Dec. 1996).

Stefan Besling, A Statistical Approach to Multilingual Phonetic Transcription, *Philips Journal of Research*, vol. 49, No. 4 (1995), 367–379.

R. Haeb–Embach, et al., Automatic Transcription of Unknown Words in a Speech Recognition System, *IEEE* (1995), pp. 840 and 843.

M.J. Witbrock, et al., Using Words and Phonetic Strings for Efficient Information Retrieval from Imperfectly Transcribed Spoken Documents, 1997, 2 pages.

Kenney Ng, Survey of Approaches to Information Retrieval of Speech Messages, Feb. 16, 1996, Odd Numbered pp. 1–33.

Kenney Ng, et al., Subword Unit Representations for Spoken Document Retrieval, *EUROPSEECH*, 1997, Sections 1 and 4.
Kenney Ng, et al., Phonetic Recognition for Spoken Document Retrieval, *ICASSP*, 1998, Sections 1, 2, 8.
Steve Cassidy, et al., EMU: an Enhanced Hierarchical Speech Data Management System, *Proc. of the 6th Australian Speech Science and Technology Conference Adalaide*, 1996, pp. 381, 383, 385.
C. Gagnoulet, et al., MAIRIEVOX: A voice–activated information system, Speech Communication, 10(1), 1991, pp. 23, 25, 27, 29, 31.
Steven Bird, et al., Towards a Formal Framework for Linguistic Annotations, Dec. 1998, Sections 1–10.
Steven Bird, et al., A Formal Framework for Linguistic Annotation, Mar. 1999, Abstract, pp. 1–49.
Martin Wechsler, et al., Spoken Document Retrieval Based on Phoneme Recognition, 1998, pp. 1–121.
Jerry H. Wright, et al., Statistical Models for Topic Identification Using Phoneme Substrings, *IEEE*, 1996, pp. 307–310.
Yutaka Kobayashi, et al., Matching Algorithms Between a Phonetic Lattice and Two Types of Templates—Lattice and Graph, IEEE, 1985, pp. 1597–1600.
G. Micca, et al., Three Dimensional DP for Phonetic Lattice Matching, Digital Signal Processing–87, (1987), pp. 547–551.
J. T. Foote, et al., Unconstrained Keyword Spotting Using Phone Lattices With Application to Spoken Document Retrieval, *Computer Speech and Language*, 11, 1997, pp. 207–224.

\* cited by examiner

*Primary Examiner*—Richemond Dorvil
*Assistant Examiner*—Donald L. Storm
(74) *Attorney, Agent, or Firm*—Fitzpatrick, Cella, Harper & Scinto

(57) ABSTRACT

The data structure is used in accessing a plurality of data files. The data stucture comprises a plurality of annotation storage areas adapted to correspond with the data files, each annotation storage area containing an annotation an annotation representing a time sequential signal and each annotation storage area comprising a plurality of block storage areas each containing phoneme and word data forming a respective temporal block of the annotation and each block having an associated time index identifying a timing of the block within the corresponding annotation. Each block storage area includes a plurality of node storage areas, each asociated with a node which represents a point in time at which a word and/or phoneme begins or ends within the corresponding annotation, and each node storage area having a time offset storage area containing a time offset defining the point in time represented by the node relative to the time index associated with the corresponding block. Each node storage area further has one or more phoneme link storage areas, each having a phoneme storage area containing data identifying a phoneme associated with corresponding node; or one or more word link storage areas, each having a word storage area containing data identifying a word associated with the corresponding node. One or more of the node storage areas has at least one of the phoneme link storage areas and at least one of the word link storage areas.

47 Claims, 21 Drawing Sheets

DATABASE ANNOTATION AND RETRIEVAL INCLUDING PHONEME DATA

This is a continuation of International Application PCT/GB00/00718, with an international filing date of Mar. 1, 2000, published in English under PCT Article 21(2) and now abandoned.

The present invention relates to the annotation of data files which are to be stored in a database for facilitating their subsequent retrieval. The present invention is also concerned with a system for generating the annotation data which is added to the data file and to a system for searching the annotation data in the database to retrieve a desired data file in response to a user's input query.

Databases of information are well known and suffer from the problem of how to locate and retrieve the desired information from the database quickly and efficiently. Existing database search tools allow the user to search the database using typed keywords. While this is quick and efficient, this type of searching is not suitable for various kinds of databases, such as video or audio databases.

According to one aspect, the present invention aims to provide a data structure which will allow the annotation of data files within a database which will allow a quick and efficient search to be carried out in response to a user's input query.

According to one aspect, the present invention provides data defining a phoneme and word lattice for use as annotation data for annotating data files to be stored within a database. Preferably, the data defines a plurality of nodes within the lattice and a plurality of links connecting the nodes within the lattice and further data associates a plurality of phonemes with a respective plurality of links and further data associates at least one word with at least one of said links.

According to another aspect, the present invention provides a method of searching a database comprising the annotation data discussed above, in response to an input query by a user. The method preferably comprises the steps of generating phoneme data and word data corresponding to the user's input query; searching the database using the word data corresponding to the user's query; selecting a portion of the data defining the phoneme and word lattice in the database for further searching in response to the results of the word search; searching said selected portion of the database using said phoneme data corresponding to the user's input query; and outputting the search results.

According to this aspect, the present invention also provides an apparatus for searching a database which employs the annotation data discussed above for annotating data files therein. The apparatus preferably comprises means for generating phoneme data and word data corresponding to a user's input query; means for searching the database using the word data corresponding to the user's input query to identify similar words within the database; means for selecting a portion of the annotation data in the database for further searching in response to the results of the word search; means for searching the selected portion using the phoneme data corresponding to the user's input query; and means for outputting the search results.

The phoneme and annotation data for a data file may be generated from the data file itself or from a typed or spoken annotation input by the user.

Exemplary embodiments of the present invention will now be described with reference to the accompanying figures, in which.

Embodiments of the present invention can be implemented using dedicated hardware circuits, but the embodiment to be described is implemented in computer software or code, which is run in conjunction with processing hardware such as a personal computer, work station, photocopier, facsimile machine, personal digital assistant (PDA) or the like.

Figure 1:
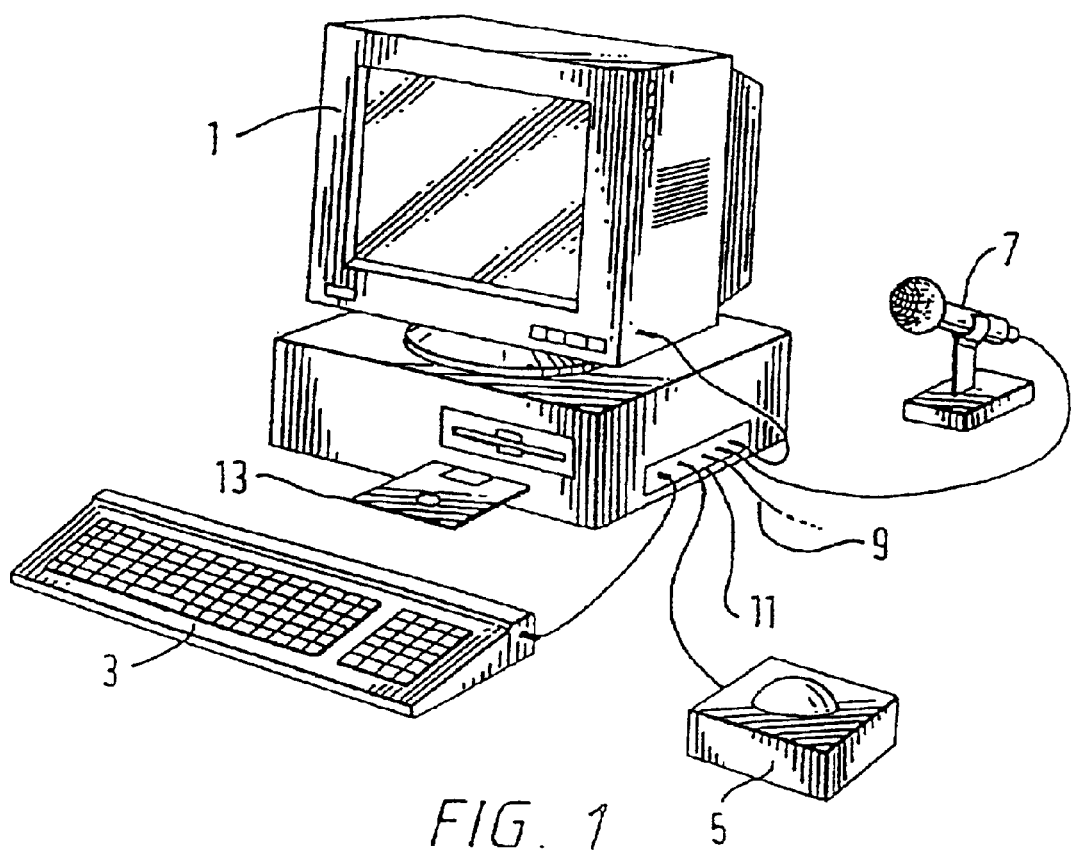
FIG. 1 is a schematic view of a computer which is programmed to operate an embodiment of the present invention.

FIG. 1 shows a personal computer (PC) 1 which is programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts acoustic speech signals from the user into equivalent electrical signals and supplies them to the PC 1 for processing. An internal modem and speech receiving circuit (not shown) is connected to the telephone line 9 so that the PC 1 can communicate with, for example, a remote computer or with a remote user.

The programme instructions which make the PC 1 operate in accordance with the present invention may be supplied for use with an existing PC 1 on, for example, a storage device such as a magnetic disc 13, or by downloading the software from the Internet (not shown) via the internal modem and telephone line 9.

Data File Annotation

Figure 2:
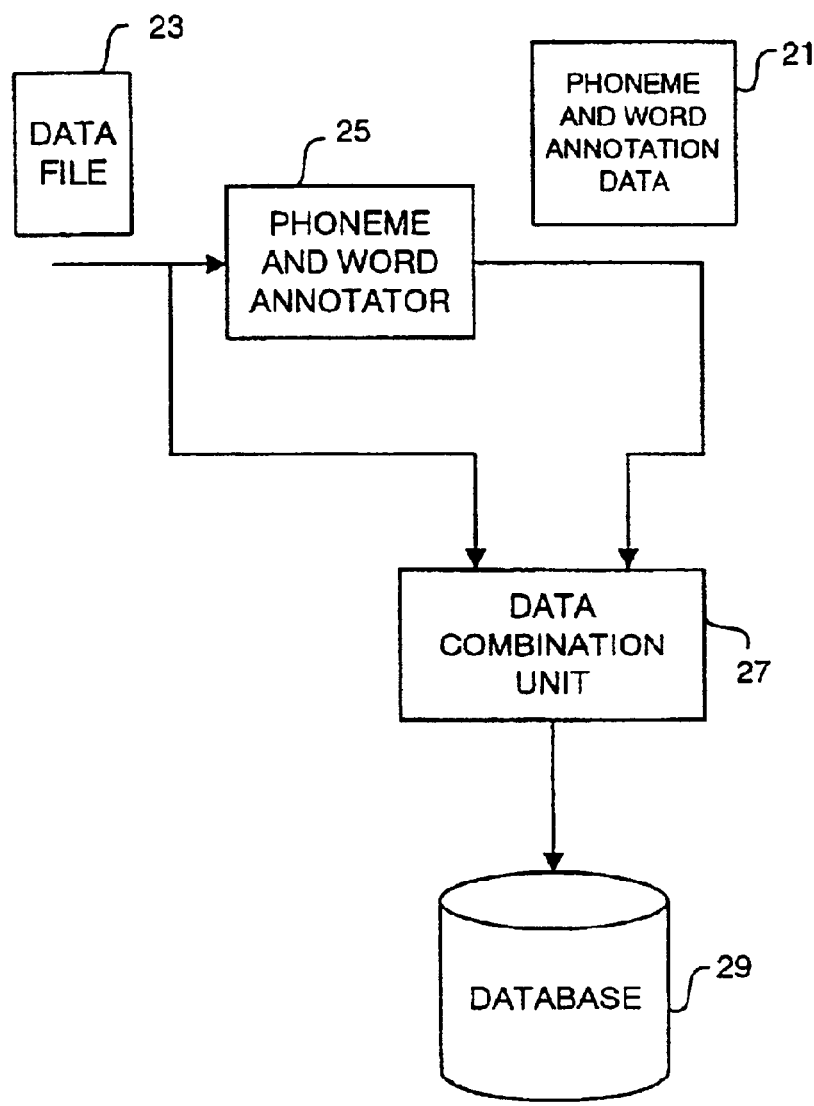
FIG. 2 is a block diagram showing a phoneme and word annotator unit which is operable to generate phoneme and word annotation data for appendage to a data file.

FIG. 2 is a block diagram illustrating the way in which annotation data 21 for an input data file 23 is generated in this embodiment by a phoneme and word annotating unit 25. As shown, the generated phoneme and word annotation data 21 is then combined with the data file 23 in the data combination unit 27 and the combined data file output thereby is input to the database 29. In this embodiment, the annotation data 21 comprises a combined phoneme (or phoneme like) and word lattice which allows the user to retrieve information from the database by a voice query. As those skilled in the art will appreciate, the data file 23 can be any kind of data file, such as, a video file, an audio file, a multimedia file etc.

A system has been proposed to generate N-Best word lists for an audio stream as annotation data by passing the audio data from a video data file through an automatic speech recognition unit. However, such word-based systems suffer from a number of problems. These include (i) that state of the art speech recognition systems still make basic mistakes in recognition; (ii) that state of the art automatic speech recognition systems use a dictionary of perhaps 20,000 to 100,000 words and cannot produce words outside that vocabulary; and (iii) that the production of N-Best lists grows exponentially with the number of hypothesis at each stage, therefore resulting in the annotation data becoming prohibitively large for long utterances.

The first of these problems may not be that significant if the same automatic speech recognition system is used to generate the annotation data and to subsequently retrieve the corresponding data file, since the same decoding error could occur. However, with advances in automatic speech recognition systems being made each year, it is likely that in the future the same type of error may not occur, resulting in the inability to be able to retrieve the corresponding data file at that later date. With regard to the second problem, this is particularly significant in video data applications, since users are likely to use names and places (which may not be in the speech recognition dictionary) as input query terms. In place of these names, the automatic speech recognition system will typically replace the out of vocabulary words with a phonetically similar word or words within the vocabulary, often corrupting nearby decodings. This can also result in the failure to retrieve the required data file upon subsequent request.

In contrast, with the proposed phoneme and word lattice annotation data, a quick and efficient search using the word data in the database 29 can be carried out and, if this fails to provide the required data file, then a further search using the more robust phoneme data can be performed. The phoneme and word lattice is an acyclic directed graph with a single entry point and a single exit point. It represents different parses of the audio stream within the data file. It is not simply a sequence of words with alternatives since each word does not have to be replaced by a single alternative, one word can be substituted for two or more words or phonemes, and the whole structure can form a substitution for one or more words or phonemes. Therefore, the density of data within the phoneme and word lattice essentially remains linear throughout the audio data, rather than growing exponentially as in the case of the N-Best technique discussed above. As those skilled in the art of speech recognition will realise, the use of phoneme data is more robust, because phonemes are dictionary independent and allow the system to cope with out of vocabulary words, such as names, places, foreign words etc. The use of phoneme data is also capable of making the system future proof, since it allows data files which are placed into the database to be retrieved even when the words were not understood by the original automatic speech recognition system.

The way in which this phoneme and word lattice annotation data can be generated for a video data file will now be described with reference to FIG. 3. As shown, the video data file 31 comprises video data 31-1, which defines the sequence of images forming the video sequence and audio data 31-2, which defines the audio which is associated with the video sequence. As is well known, the audio data 31-2 is time synchronised with the video data 31-1 so that, in use, both the video and audio data are supplied to the user at the same time.

Figure 3:
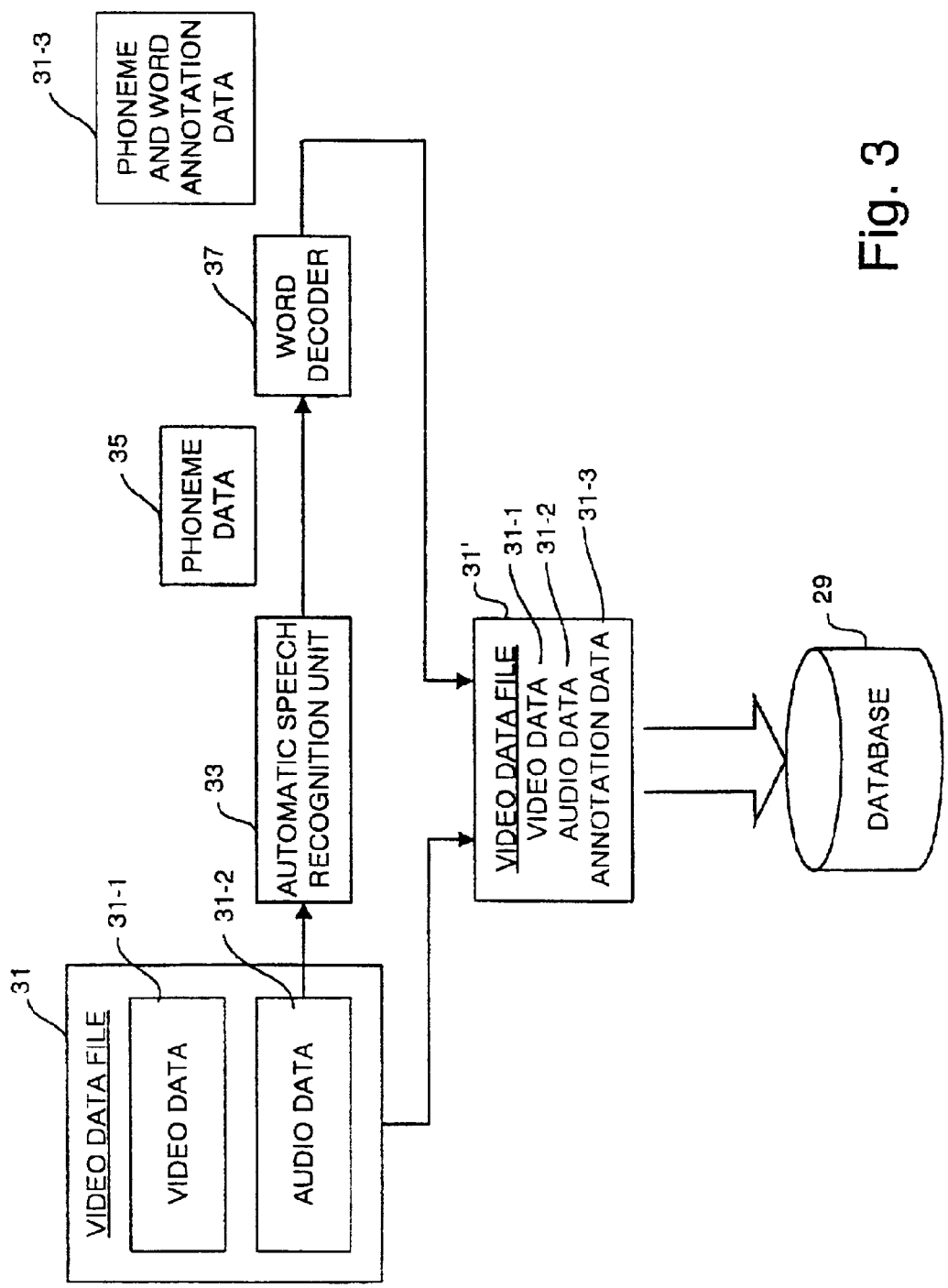
FIG. 3 is a block diagram illustrating one way in which the phoneme and word annotator can generate the annotation data from an input video data file.

As shown in FIG. 3, in this embodiment, the audio data 31-2 is input to an automatic speech recognition unit 33, which is operable to generate a phoneme lattice corresponding to the stream of audio data 31-2. Such an automatic speech recognition unit 33 is commonly available in the art and will not be described in further detail. The reader is referred to, for example, the book entitled 'Fundamentals of Speech Recognition' by Lawrence Rabiner and Biing-Hwang Juang and, in particular, to pages 42 to 50 thereof, for further information on this type of speech recognition system.

Figure 4A:
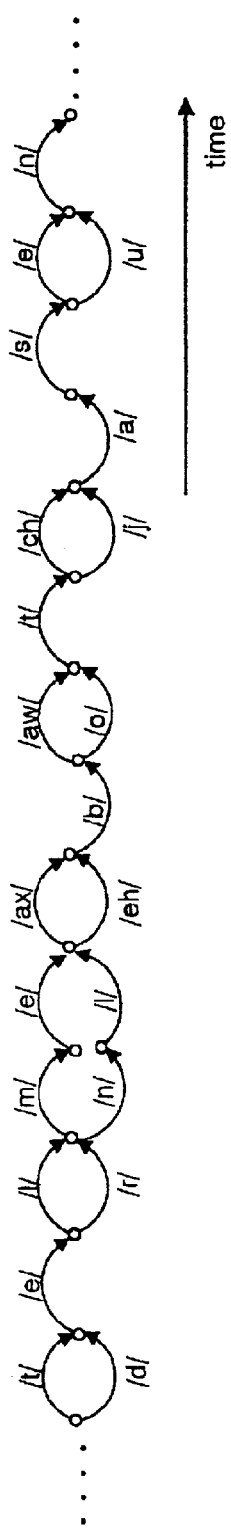
FIG. 4a is a schematic diagram of a phoneme lattice for an example audio string from the input video data file.

FIG. 4a illustrates the form of the phoneme lattice data output by the speech recognition unit 33, for the input audio corresponding to the phrase ' . . . tell me about Jason . . . '. As shown, the automatic speech recognition unit 33 identifies a number of different possible phoneme strings which correspond to this input audio utterance. For example, the speech recognition system considers that the first phoneme in the audio string is either a /t/ or a /d/. As is well known in the art of speech recognition, these different possibilities can have their own weighting which is generated by the speech recognition unit 33 and is indicative of the confidence of the speech recognition unit's output. For example, the phoneme /t/ may be given a weighting of 0.9 and the phoneme /d/ may be given a weighting of 0.1, indicating that the speech recognition system is fairly confident that the corresponding portion of audio represents the phoneme /t/, but that it still may be the phoneme /d/. In this embodiment, however, this weighting of the phonemes is not performed.

Figure 4B:
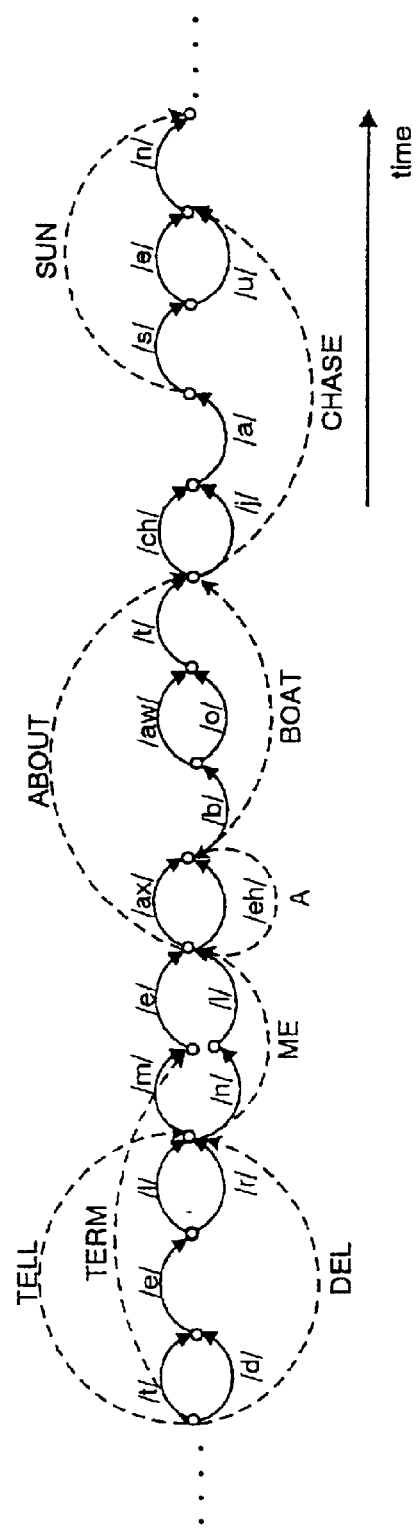
FIG. 4b is a schematic diagram of a word and phoneme lattice embodying one aspect of the present invention, for an example audio string from the input video data file.

As shown in FIG. 3, the phoneme lattice data 35 output by the automatic speech recognition unit 33 is input to a word decoder 37 which is operable to identify possible words within the phoneme lattice data 35. In this embodiment, the words identified by the word decoder 37 are incorporated into the phoneme lattice data structure. For example, for the phoneme lattice shown in FIG. 4a, the word decoder 37 identifies the words 'tell', 'dell', 'term', 'me', 'a', 'boat', 'about', 'chase' and 'sun'. As shown in FIG. 4b, these identified words are added to the phoneme lattice data structure output by the speech recognition unit 33, to generate a phoneme and word lattice data structure which forms the annotation data 31-3. This annotation data 31-3 is then combined with the video data file 31 to generate an augmented video data file 31' which is then stored in the database 29. As those skilled in the art will appreciate, in a similar way to the way in which the audio data 31-2 is time synchronised with the video data 31-1, the annotation data 31-3 is also time synchronised and associated with the corresponding video data 31-1 and audio data 31-2, so that a desired portion of the video and audio data can be retrieved by searching for and locating the corresponding portion of the annotation data 31-3.

In this embodiment, the annotation data 31-3 stored in the database 29 has the following general form:

HEADER
    time of start
    flag if word if phoneme if mixed
    time index associating the location of blocks of annotation data within memory to a given time point.
    word set used (i.e. the dictionary)
    phoneme set used
    the language to which the vocabulary pertains
Block(i) i=0,1,2, . . .
    node $N_j$ j=0,1,2, . . .
        time offset of node from start of block
        phoneme links (k) k=0,1,2 . . . offset to node $N_j=N_k-N_j$ ($N_k$ is node to which link K extends) or if $N_k$ is in block (i+1) offset to node $N_j=N_k+N_b-N_j$ (where $N_b$ is the number of nodes in block (i)) phoneme associated with link (k)
        word links (l) l=0,1,2, . . . offset to node $N_j=N_i-N_j$ ($N_j$ is node to which link l extends) or if $N_k$ is in block (i+1) offset to node $N_j=N_k+N_b-N_j$ (where $N_b$ is the number of nodes in block (i)) word associated with link (l)

The time of start data in the header can identify the time and date of transmission of the data. For example, if the video file is a news broadcast, then the time of start may include the exact time of the broadcast and the date on which it was broadcast.

The flag identifying if the annotation data is word annotation data, phoneme annotation data or if it is mixed is provided since not all the data files within the database will include the combined phoneme and word lattice annotation data discussed above, and in this case, a different search strategy would be used to search this annotation data.

In this embodiment, the annotation data is divided into blocks in order to allow the search to jump into the middle of the annotation data for a given audio data stream. The header therefore includes a time index which associates the location of the blocks of annotation data within the memory to a given time offset between the time of start and the time corresponding to the beginning of the block. The blocks of annotation data are preferably arranged in blocks of equal time duration.

The header also includes data defining the word set used (i.e. the dictionary), the phoneme set used and the language to which the vocabulary pertains. The header may also include details of the automatic speech recognition system used to generate the annotation data and any appropriate settings thereof which were used during the generation of the annotation data.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link. They also identify the offset to the current node. For example, if node $N_{50}$ is linked to node $N_{55}$ by a phoneme link, then the offset to node $N_{50}$ is 5. As those skilled in the art will appreciate, using an offset indication like this allows the division of the continuous annotation data into separate blocks.

In an embodiment where an automatic speech recognition unit outputs weightings indicative of the confidence of the speech recognition units output, these weightings or confidence scores would also be included within the data structure. In particular, a confidence score would be provided for each node which is indicative of the confidence of arriving at the node and each of the phoneme and word links would include a transition score depending upon the weighting given to the corresponding phoneme or word. These weightings would then be used to control the search and retrieval of the data files by discarding those matches which have a low confidence score.

Data File Retrieval

Figure 5:
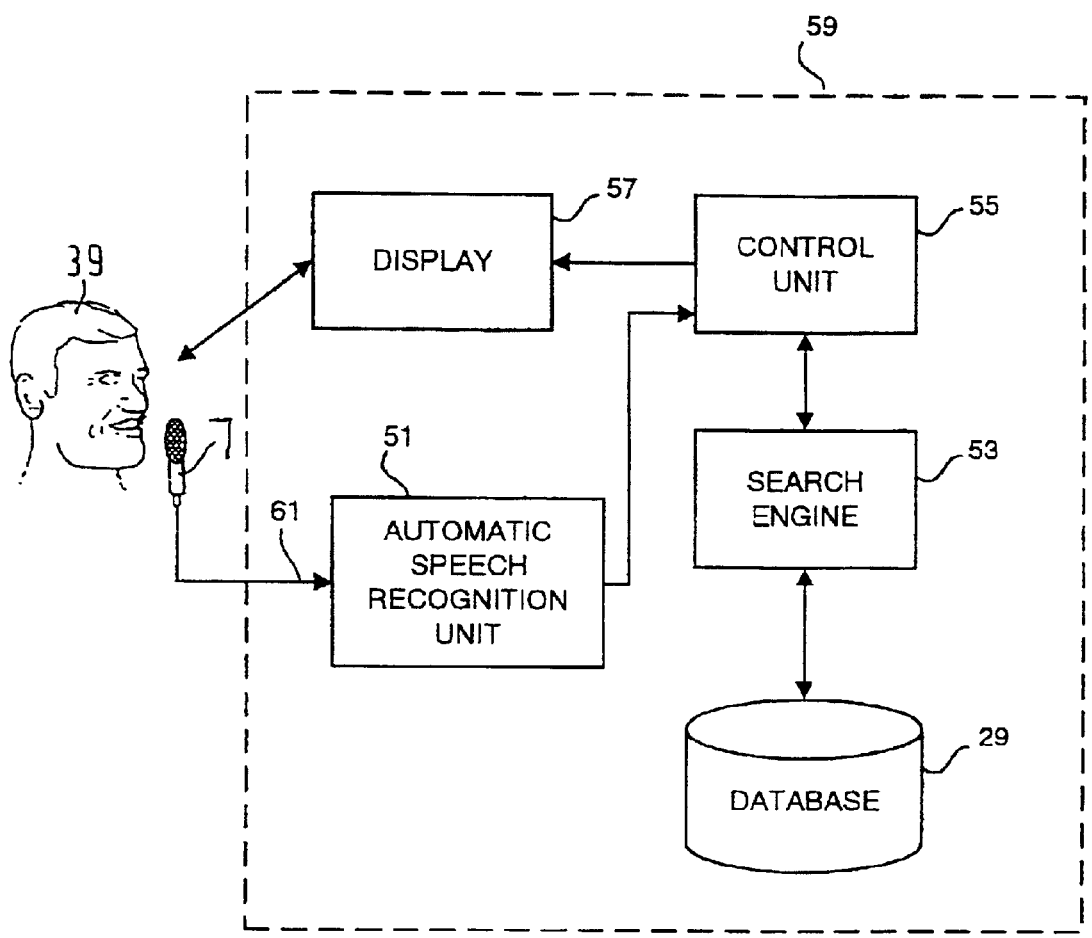
FIG. 5 is a schematic block diagram of a user's terminal which allows the user to retrieve information from the database by a voice query.

FIG. 5 is a block diagram illustrating the form of a user terminal 59 which can be used to retrieve the annotated data files from the database 29. This user terminal 59 may be, for example, a personal computer, hand held device or the like. As shown, in this embodiment, the user terminal 59 comprises the database 29 of annotated data files, an automatic speech recognition unit 51, a search engine 53, a control unit 55 and a display 57. In operation, the automatic speech recognition unit 51 is operable to process an input voice query from the user 39 received via the microphone 7 and the input line 61 and to generate therefrom corresponding phoneme and word data. This data may also take the form of a phoneme and word lattice, but this is not essential. This phoneme and word data is then input to the control unit 55 which is operable to initiate an appropriate search of the database 29 using the search engine 53. The results of the search, generated by the search engine 53, are then transmitted back to the control unit 55 which analyses the search results and generates and displays appropriate display data to the user via the display 57.

Figure 6A:
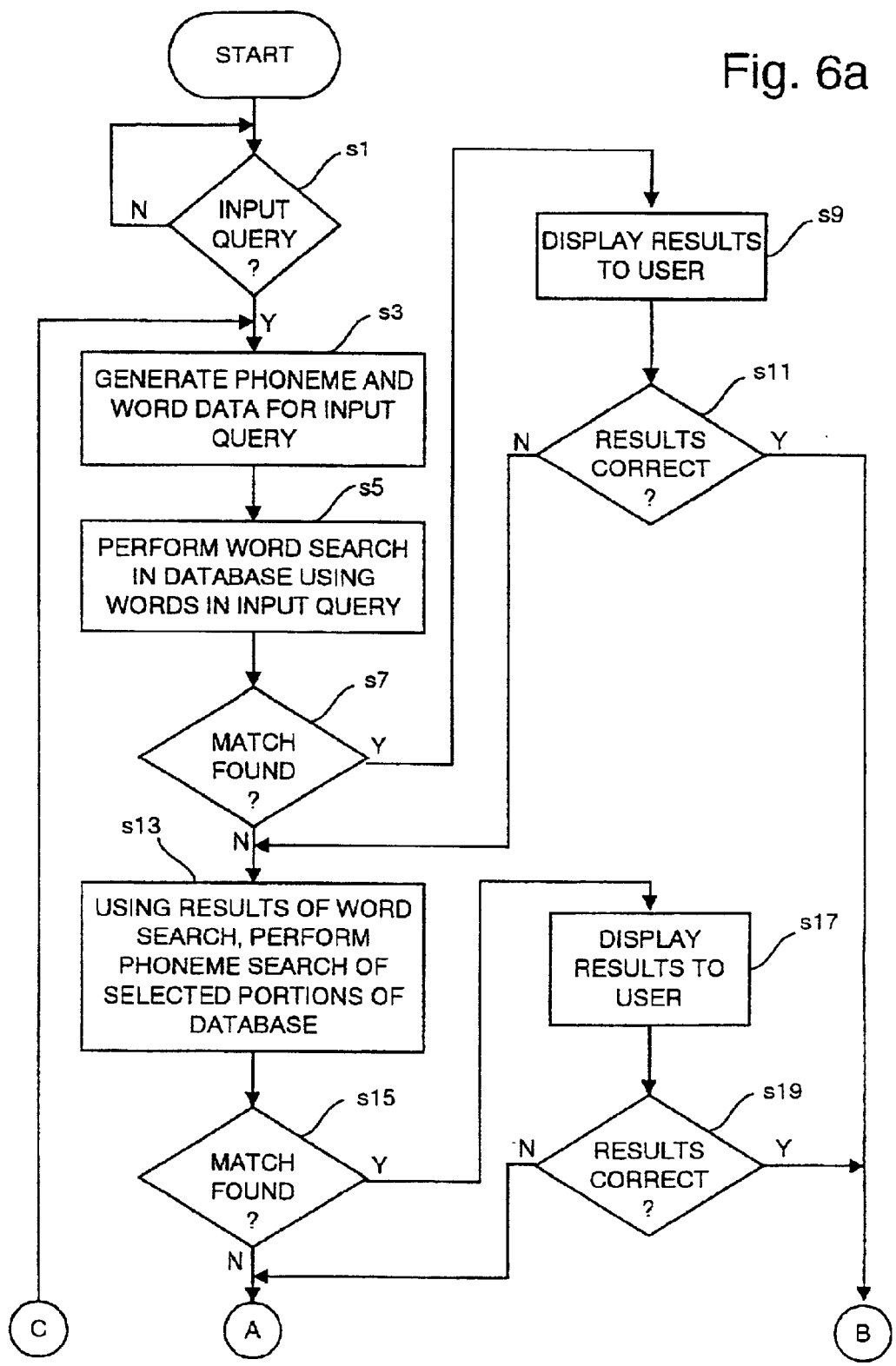
FIG. 6a is a flow diagram illustrating part of the flow control of the user terminal shown in FIG. 5.
Figure 6B:
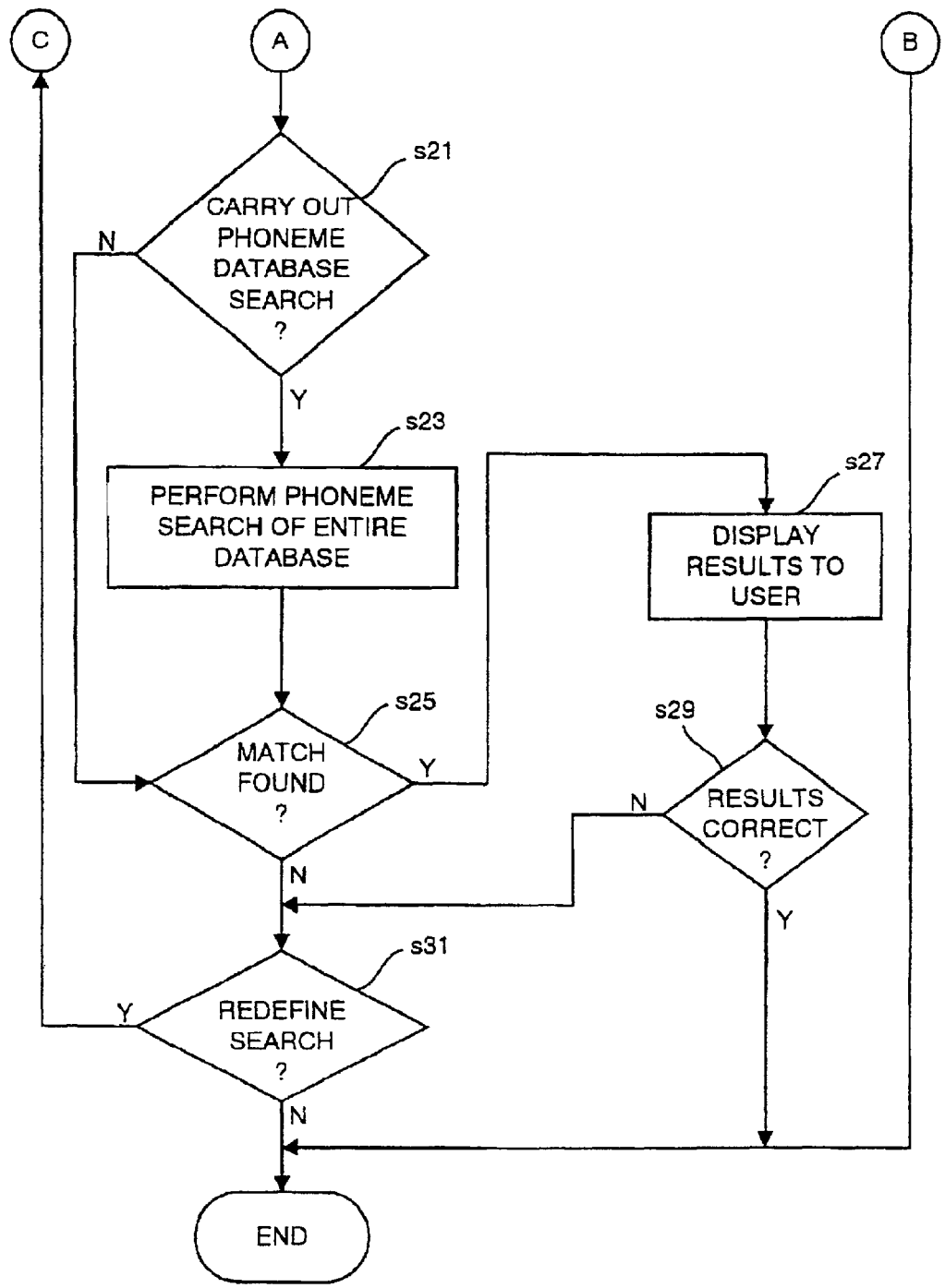
FIG. 6b is a flow diagram illustrating the remaining part of the flow control of the user terminal shown in FIG. 5.

FIGS. 6a and 6b are flow diagrams which illustrate the way in which the user terminal 59 operates in this embodiment. In step s1, the user terminal 59 is in an idle state and awaits an input query from the user 39. Upon receipt of an input query, the phoneme and word data for the input query is generated in step s3 by the automatic speech recognition unit 51. The control unit 55 then instructs the search engine 53, in step s5, to perform a search in the database 29 using the word data generated for the input query. The word search employed in this embodiment is the same as is currently being used in the art for typed keyword searches, and will not be described in more detail here. If in step s7, the control unit 55 identifies from the search results, that a match for the user's input query has been found, then it outputs the search results to the user via the display 57.

In this embodiment, the user terminal 59 then allows the user to consider the search results and awaits the user's confirmation as to whether or not the results correspond to the information the user requires. If they are, then the processing proceeds from step s11 to the end of the processing and the user terminal 59 returns to its idle state and awaits the next input query. If, however, the user indicates (by, for example, inputting an appropriate voice command) that the search results do not correspond to the desired information, then the processing proceeds from step s11 to step s13, where the search engine 53 performs a phoneme search of the database 29. However, in this embodiment, the phoneme search performed in step s13 is not of the whole database 29, since this could take several hours depending on the size of the database 29.

Instead, the phoneme search performed in step s13 uses the results of the word search performed in step s5 to identify one or more portions within the database which may correspond to the user's input query. The way in which the phoneme search performed in step s13 is performed in this embodiment, will be described in more detail later. After the phoneme search has been performed, the control unit 55 identifies, in step s15, if a match has been found. If a match has been found, then the processing proceeds to step s17 where the control unit 55 causes the search results to be displayed to the user on the display 57. Again, the system then awaits the user's confirmation as to whether or not the search results correspond to the desired information. If the results are correct, then the processing passes from step s19 to the end and the user terminal 59 returns to its idle state and awaits the next input query. If however, the user indicates that the search results do not correspond to the desired information, then the processing proceeds from step s19 to step s21, where the control unit 55 is operable to ask the user, via the display 57, whether or not a phoneme search should be performed of the whole database 29. If in response to this query, the user indicates that such a search should be performed, then the processing proceeds to step s23 where the search engine performs a phoneme search of the entire database 29.

On completion of this search, the control unit 55 identifies, in step s25, whether or not a match for the user's input query has been found. If a match is found, then the processing proceeds to step s27 where the control unit 55 causes the search results to be displayed to the user on the display 57. If the search results are correct, then the processing proceeds from step s29 to the end of the processing and the user terminal 59 returns to its idle state and awaits the next input query. If, on the other hand, the user indicates that the search results still do not correspond to the desired information, then the processing passes to step s31 where the control unit 55 queries the user, via the display 57, whether or not the user wishes to redefine or amend the search query. If the user does wish to redefine or amend the search query, then the processing returns to step s3 where the user's subsequent input query is processed in a similar manner. If the search is not to be redefined or amended, then the search results and the user's initial input query are discarded and the user terminal 59 returns to its idle state and awaits the next input query.

Phoneme Search

As mentioned above, in steps s13 and s23, the search engine 53 compares the phoneme data of the input query with the phoneme data in the phoneme and word lattice annotation data stored in the database 29. Various techniques can be used including standard pattern matching techniques such as dynamic programming, to carry out this comparison. In this embodiment, a technique which we refer to as M-GRAMS is used. This technique was proposed by Ng, K. and Zue, V. W. and is discussed in, for example, the paper entitled "Subword unit representations for spoken document retrieval" published in the proceedings of Eurospeech 1997.

The problem with searching for individual phonemes is that there will be many occurrences of each phoneme within the database. Therefore, an individual phoneme on its own does not provide enough discriminability to be able to match the phoneme string of the input query with the phoneme strings within the database. Syllable sized units, however, are likely to provide more discriminability, although they are not easy to identify.

Figure 8:
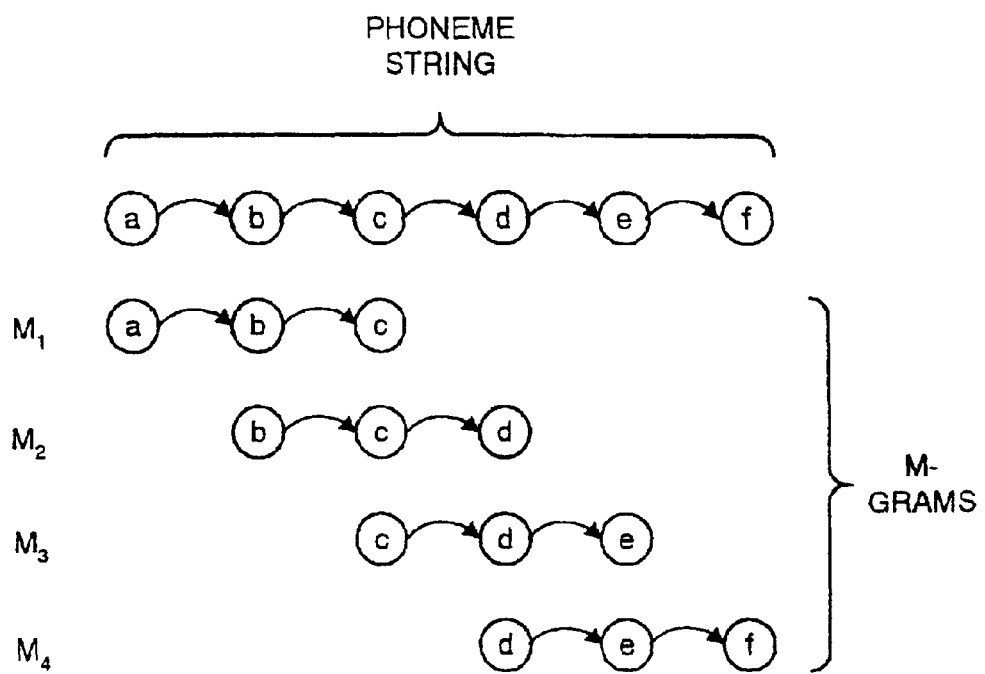
FIG. 8 is a schematic diagram illustrating the form of a phoneme string and four M-GRAMS generated from the phoneme string.

The M-GRAM technique presents a suitable compromise between these two possibilities and takes overlapping fixed size fragments, or M-GRAMS, of the phoneme string to provide a set of features. This is illustrated in FIG. 8, which shows part of an input phoneme string having phonemes a, b, c, d, e, and f, which are split into four M-GRAMS (a, b, c), (b, c, d), (c, d, e) and (d, e, f). In this illustration, each of the four M-GRAMS comprises a sequence of three phonemes which is unique and represents a unique feature ($f_i$) which can be found within the input phoneme string.

Figure 7:
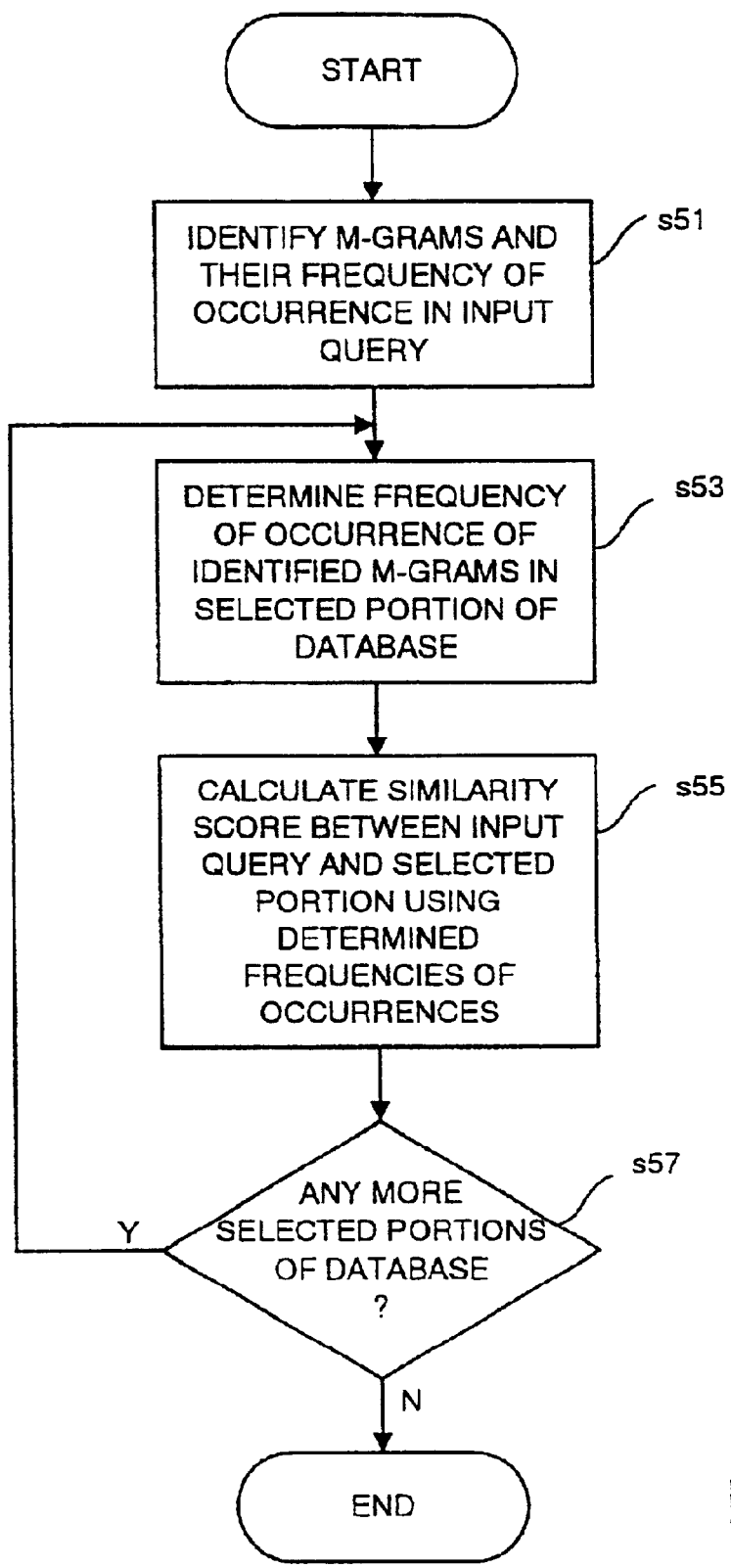
FIG. 7 is a flow diagram illustrating the way in which a search engine forming part of the user's terminal carries out a phoneme search within the database.

Therefore, referring to FIG. 7, the first step s51 in performing the phoneme search in step s13 shown in FIG. 6, is to identify all the different M-GRAMS which are in the input phoneme data and their frequency of occurrence. Then, in step s53, the search engine 53 determines the frequency of occurrence of the identified M-GRAMS in the selected portion of the database (identified from the word search performed in step s5 in FIG. 6). To illustrate this, for a given portion of the database and for the example M-GRAMS illustrated in FIG. 8, this yields the following table of information:

| M-GRAM (feature ($f_i$)) | Input phoneme string frequency of occurrence (g) | Phoneme string of selected portion of database (a) |
|---|---|---|
| $M_1$ | 1 | 0 |
| $M_2$ | 2 | 2 |
| $M_3$ | 3 | 2 |
| $M_4$ | 1 | 1 |

Figure 9:
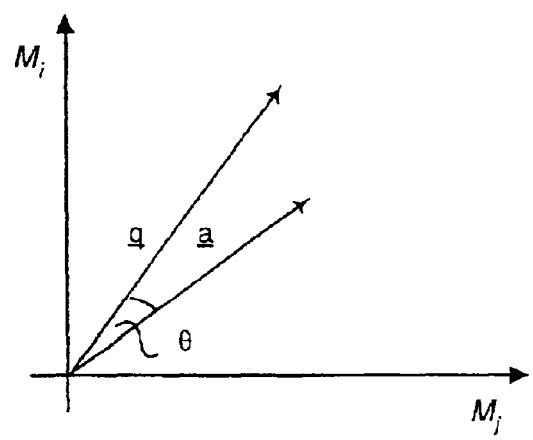
FIG. 9 is a plot showing two vectors and the angle between the two vectors.

Next, in step s55, the search engine 53 calculates a similarity score representing a similarity between the phoneme string of the input query and the phoneme string of the selected portion from the database. In this embodiment, this similarity score is determined using a cosine measure using the frequencies of occurrence of the identified M-GRAMS in the input query and in the selected portion of the database as vectors. The philosophy behind this technique is that if the input phoneme string is similar to the selected portion of the database phoneme string, then the frequency of occurrence of the M-GRAM features will be similar for the two phoneme strings. Therefore, if the frequencies of occurrence of the M-GRAMS are considered to be vectors (i.e. considering the second and third columns in the above table as vectors), then if there is a similarity between the input phoneme string and the selected portion of the database, then the angle between these vectors should be small. This is illustrated in FIG. 9 for two-dimensional vectors $\underline{a}$ and $\underline{g}$, with the angle between the vectors given as θ. In the example shown in FIG. 8, the vectors $\underline{a}$ and $\underline{g}$ will be four dimensional vectors and the similarity score can be calculated from:

$$\text{SCORE} = \cos\theta = \frac{\underline{a} \cdot \underline{g}}{|\underline{a}||\underline{g}|} \quad (1)$$

This score is then associated with the current selected portion of the database and stored until the end of the search. In some applications, the vectors used in the calculation of the cosine measure will be the logarithm of these frequencies of occurrences, rather than the frequencies of occurrences themselves.

The processing then proceeds to step s57 where the search engine 53 identifies whether or not there are any more selected portions of phoneme strings from the database 29. If there are, then the processing returns to step s53 where a similar procedure is followed to identify the score for this portion of the database. If there are no more selected portions, then the searching ends and the processing returns to step s15 shown in FIG. 6, where the control unit considers the scores generated by the search engine 53 and identifies whether or not there is a match by, for example, comparing the calculated scores with a predetermined threshold value.

As those skilled in the art will appreciate, a similar matching operation will be performed in step s23 shown in FIG. 6. However, since the entire database is being searched, this search is carried out by searching each of the blocks discussed above in turn.

Alternative Embodiments

As those skilled in the art will appreciate, this type of phonetic and word annotation of data files in a database provides a convenient and powerful way to allow a user to search the database by voice. In the illustrated embodiment, a single audio data stream was annotated and stored in the database for subsequent retrieval by the user. As those skilled in the art will appreciate, when the input data file corresponds to a video data file, the audio data within the data file will usually include audio data for different speakers. Instead of generating a single stream of annotation data for the audio data, separate phoneme and word lattice annotation data can be generated for the audio data of each speaker. This may be achieved by identifying, from the pitch or from another distinguishing feature of the speech signals, the audio data which corresponds to each of the speakers and then by annotating the different speaker's audio separately. This may also be achieved if the audio data was recorded in stereo or if an array of microphones were used in generating the audio data, since it is then possible to process the audio data to extract the data for each speaker.

Figure 10:
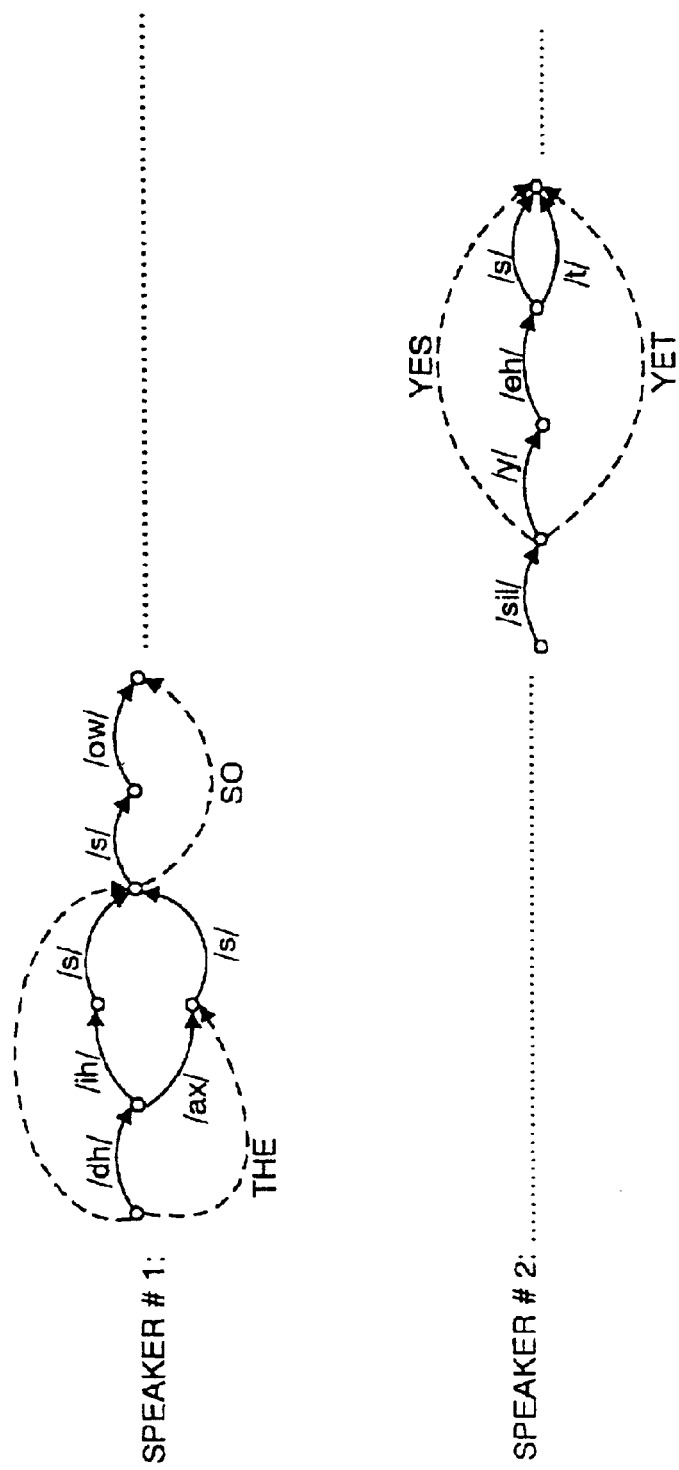
FIG. 10 is a schematic diagram of a pair of word and phoneme lattices, for example audio strings from two speakers.

FIG. 10 illustrates the form of the annotation data in such an embodiment, where a first speaker utters the words ". . . this so" and the second speaker replies "yes". As illustrated, the annotation data for the different speakers' audio data are time synchronised, relative to each other, so that the annotation data is still time synchronised to the video and audio data within the data file. In such an embodiment, the header information in the data structure should preferably include a list of the different speakers within the annotation data and, for each speaker, data defining that speaker's language, accent, dialect and phonetic set, and each block should identify those speakers that are active in the block.

In the above embodiments, a speech recognition system was used to generate the annotation data for annotating a data file in the database. As those skilled in the art will appreciate, other techniques can be used to generate this annotation data. For example, a human operator can listen to the audio data and generate a phonetic and word transcription to thereby manually generate the annotation data.

In the above embodiments, the annotation data was generated from audio stored in the data file itself. As those skilled in the art will appreciate, other techniques can be used to input the annotation data.

Figure 11:
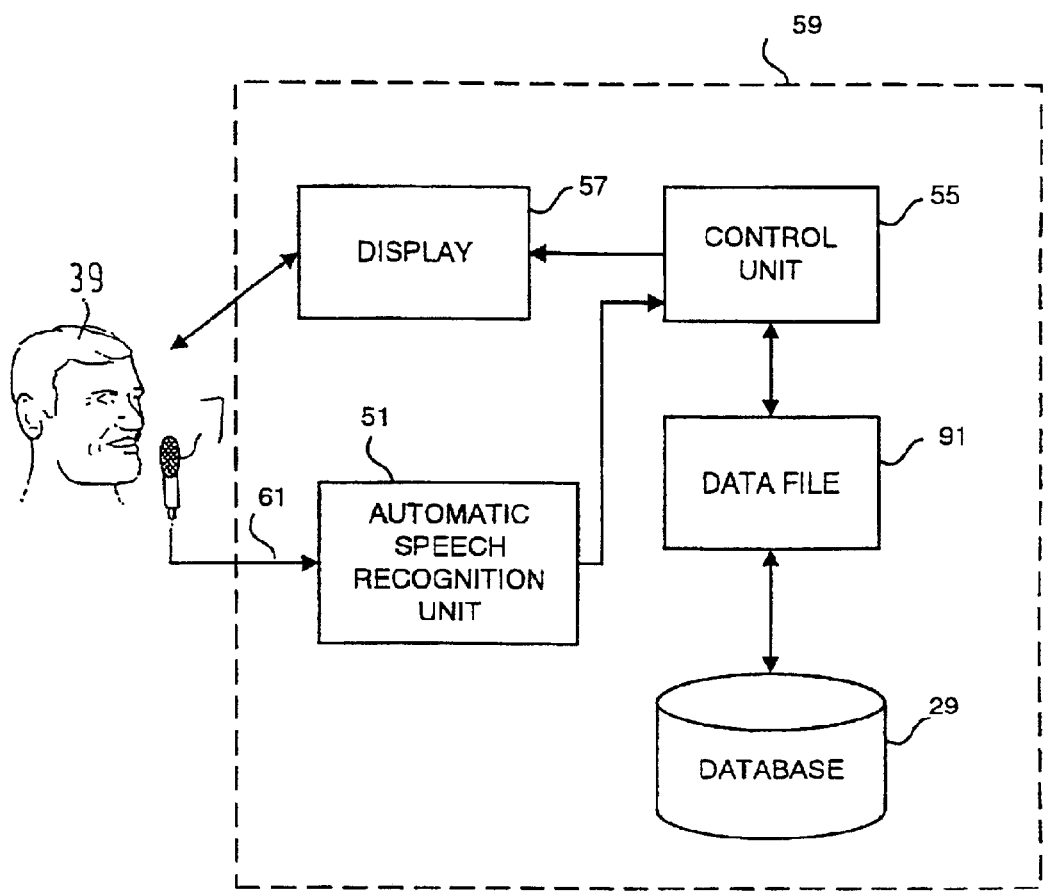
FIG. 11 is a schematic block diagram illustrating a user terminal which allows the annotation of a data file with annotation data generated from an audio signal input from a user.

FIG. 11 illustrates the form of a user terminal 59 which allows a user to input voice annotation data via the microphone 7 for annotating a data file 91 which is to be stored in the database 29. In this embodiment, the data file 91 comprises a two dimensional image generated by, for example, a camera. The user terminal 59 allows the user 39 to annotate the 2D image with an appropriate annotation which can be used subsequently for retrieving the 2D image from the database 29. In this embodiment, the input voice annotation signal is converted, by the automatic speech recognition unit 51, into phoneme and word lattice annotation data which is passed to the control unit 55. In response to the user's input, the control unit 55 retrieves the appropriate 2D file from the database 29 and appends the phoneme and word annotation data to the data file 91. The augmented data file is then returned to the database 29. During this annotating step, the control unit 55 is operable to display the 2D image on the display 57 so that the user can ensure that the annotation data is associated with the correct data file 91.

Figure 12:
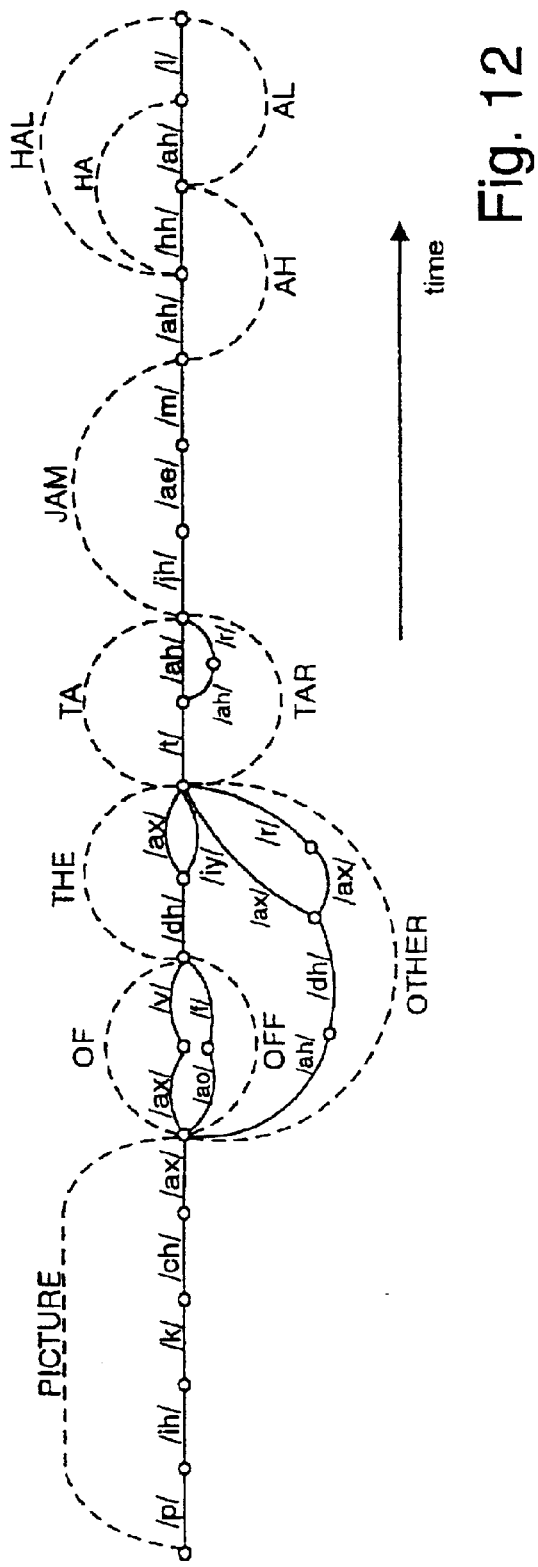
FIG. 12 is a schematic diagram of phoneme and word lattice annotation data which is generated for an example utterance input by the user for annotating a data file.

The automatic speech recognition unit 51 generates the phoneme and word lattice annotation data by (i) generating a phoneme lattice for the input utterance; (ii) then identifying words within the phoneme lattice; and (iii) finally by combining the two. FIG. 12 illustrates the form of the phoneme and word lattice annotation data generated for the input utterance "picture of the Taj-Mahal". As shown, the automatic speech recognition unit identifies a number of different possible phoneme strings which correspond to this input utterance. As shown in FIG. 12, the words which the automatic speech recognition unit 51 identifies within the phoneme lattice are incorporated into the phoneme lattice data structure. As shown, for the example phrase, the automatic speech recognition unit 51 identifies the words "picture", "of", "off", "the", "other", "ta", "tar", "jam", "ah", "hal", "ha" and "al". The control unit 55 is then operable to add this annotation data to the 2D image data file 91 which is then stored in a database 29.

As those skilled in the art will appreciate, this embodiment can be used to annotate any kind of image such as x-rays of patients, 3D videos of, for example, NMR scans, ultrasound scans etc. It can also be used to annotate one-dimensional data, such as audio data or seismic data.

Figure 13:
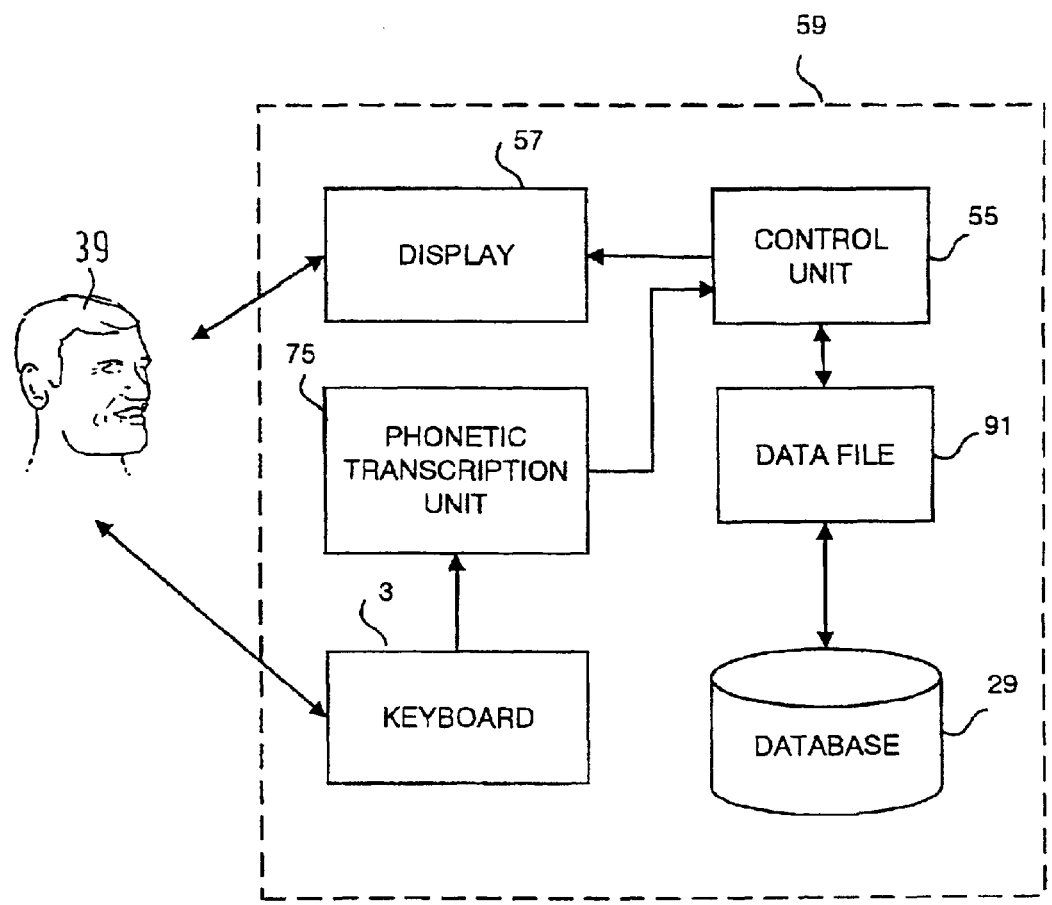
FIG. 13 is a schematic block diagram illustrating a user terminal which allows the annotation of a data file with annotation data generated from a typed input from a user.

In the above embodiment, a data file was annotated from a voiced annotation. As those skilled in the art will appreciate, other techniques can be used to input the annotation. For example, FIG. 13 illustrates the form of a user terminal 59 which allows a user to input typed annotation data via the keyboard 3 for annotating a data file 91 which is to be stored in a database 29. In this embodiment, the typed input is converted, by the phonetic transcription unit 75, into the phoneme and word lattice annotation data (using an internal phonetic dictionary (not shown)) which is passed to the control unit 55. In response to the user's input, the control unit 55 retrieves the appropriate 2D file from the database 29 and appends the phoneme and word annotation data to the data file 91. The augmented data file is then returned to the database 29. During this annotating step, the control unit 55 is operable to display the 2D image on the display 57 so that the user can ensure that the annotation data is associated with the correct data file 91.

Figure 14:
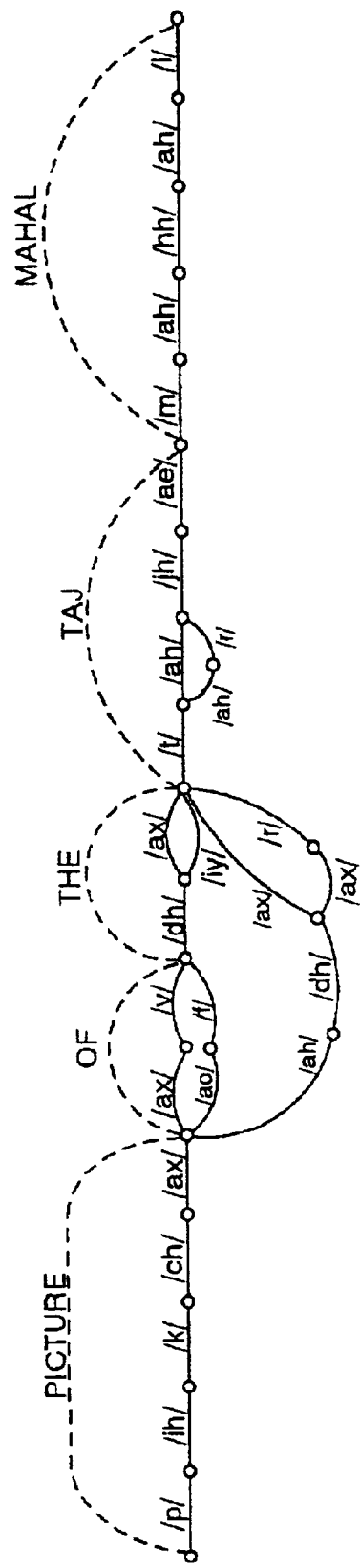
FIG. 14 is a schematic diagram of phoneme and word lattice annotation data which is generated for a typed input by the user for annotating a data file.

FIG. 14 illustrates the form of the phoneme and word lattice annotation data generated for the input utterance "picture of the Taj-Mahal". As shown in FIG. 2, the phoneme and word lattice is an acyclic directed graph with a single entry point and a single exit point. It represents different parses of the user's input. As shown, the phonetic transcription unit 75 identifies a number of different possible phoneme strings which correspond to the typed input.

Figure 15:
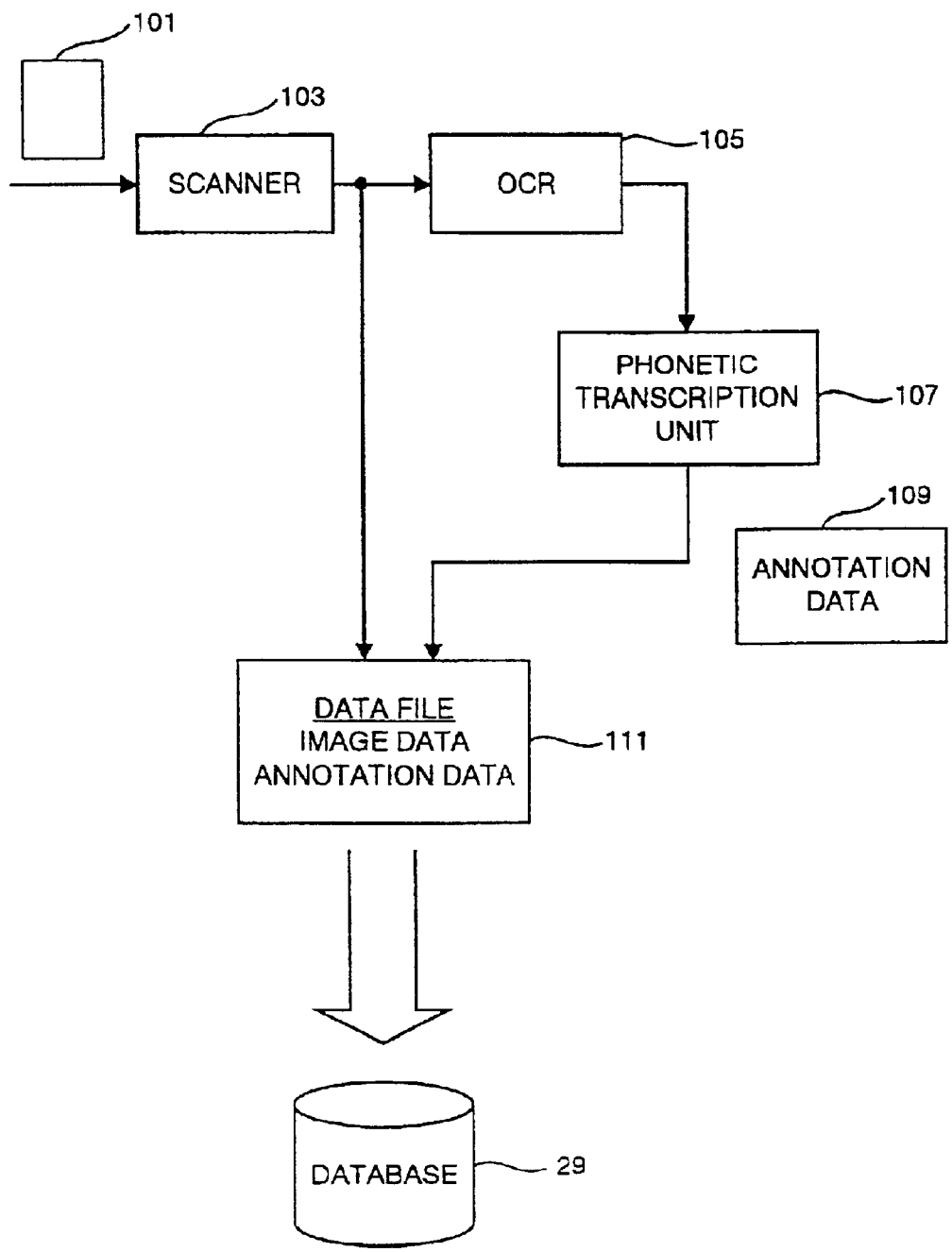
FIG. 15 is a block schematic diagram showing the form of a document annotation system.

FIG. 15 is a block diagram illustrating a document annotation system. In particular, as shown in FIG. 15, a text document 101 is converted into an image data file by a document scanner 103. The image data file is then passed to an optical character recognition (OCR) unit 105 which converts the image data of the document 101 into electronic text. This electronic text is then supplied to a phonetic transcription unit 107 which is operable to generate phoneme and word annotation data 109 which is then appended to the image data output by the scanner 103 to form a data file 111. As shown, the data file 111 is then stored in the database 29 for subsequent retrieval. In this embodiment, the annotation data 109 comprises the combined phoneme and word lattice described above which allows the user to subsequently retrieve the data file 111 from the database 29 by a voice query.

Figure 16:
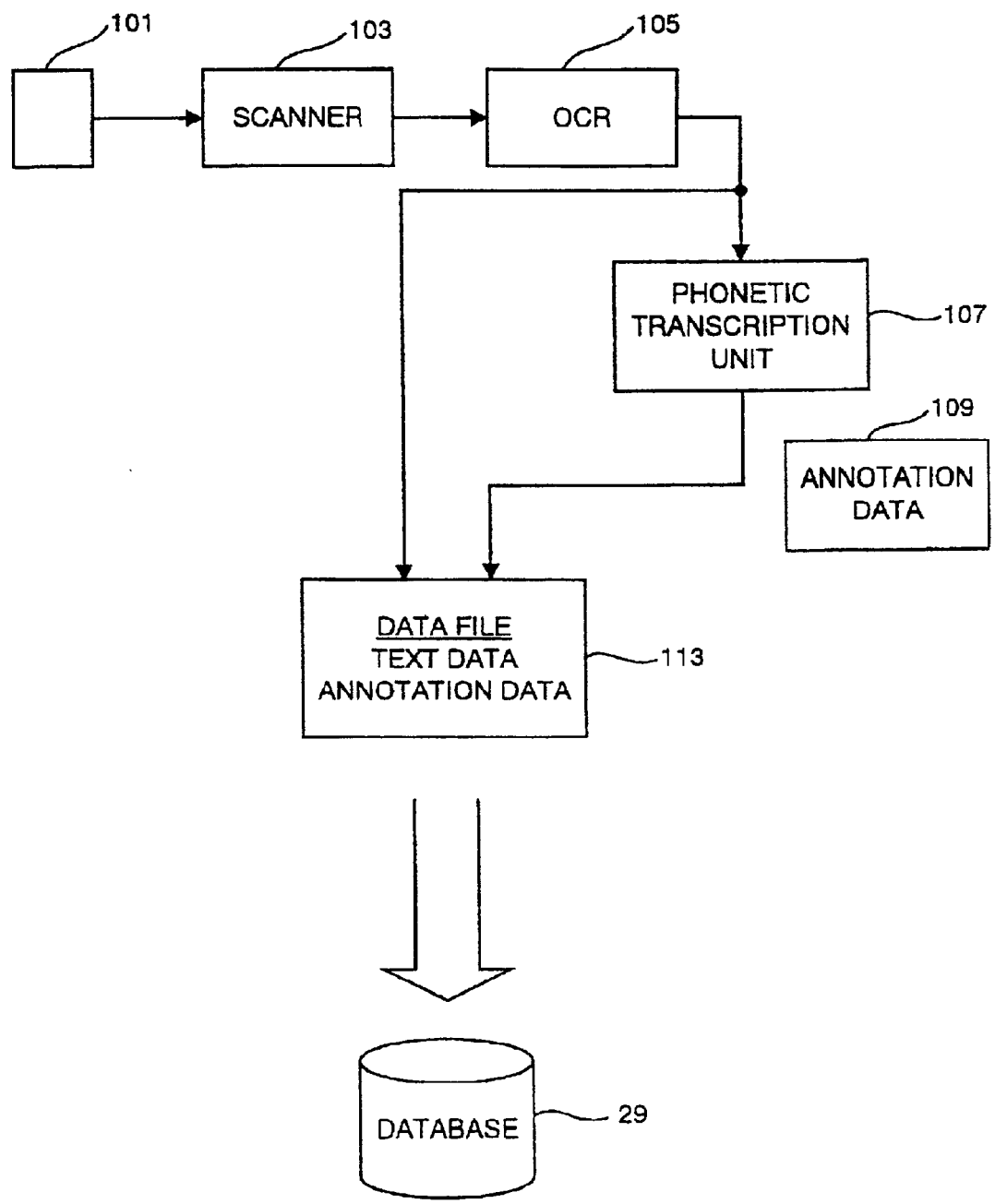
FIG. 16 is a block schematic diagram of an alternative document annotation system.

FIG. 16 illustrates a modification to the document annotation system shown in FIG. 15. The difference between the system shown in FIG. 16 and the system shown in FIG. 15 is that the output of the optical character recognition unit 105 is used to generate the data file 113, rather than the image data output by the scanner 103. The rest of the system shown in FIG. 16 is the same as that shown in FIG. 15 and will not be described further.

Figure 17:
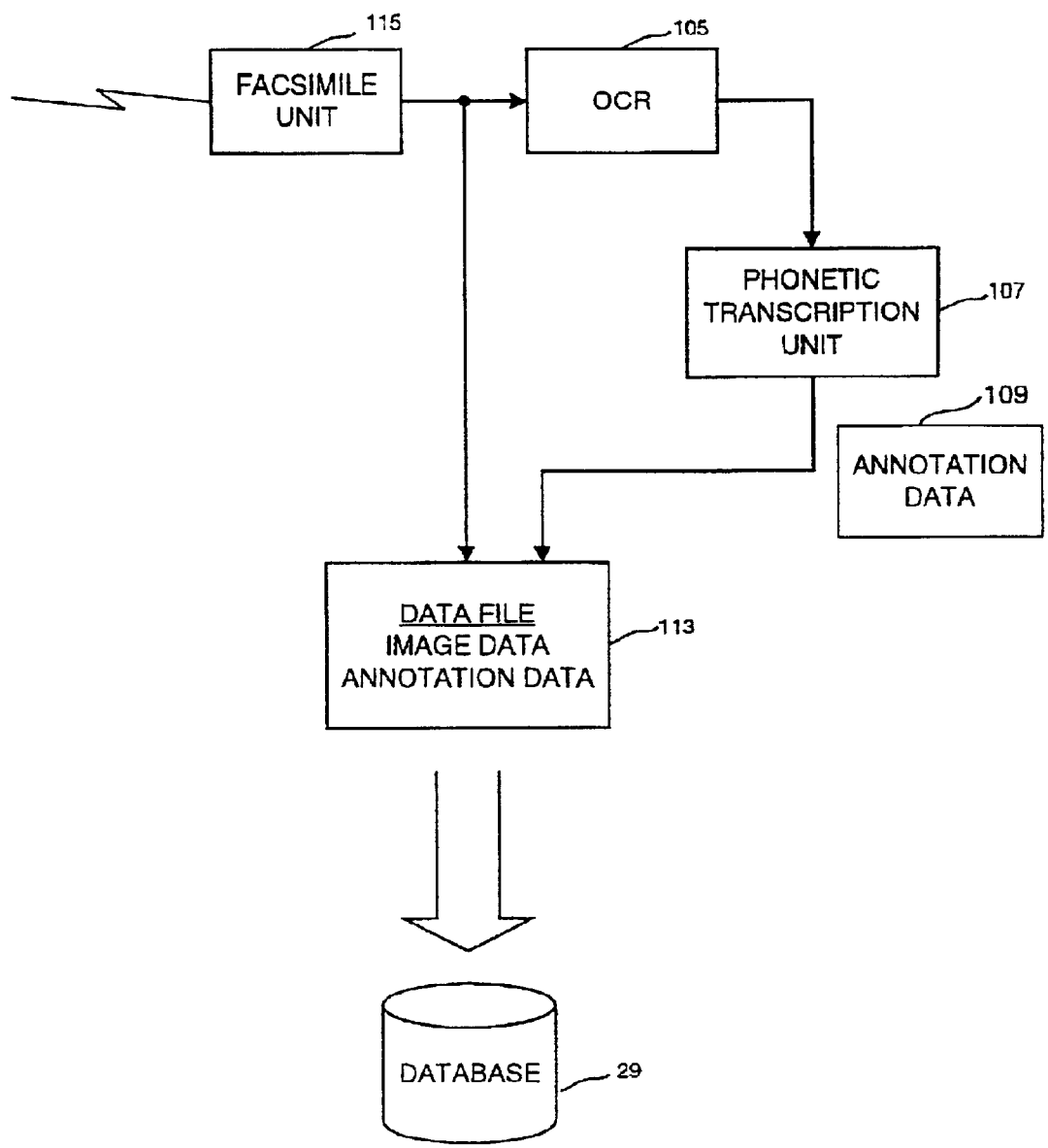
FIG. 17 is a block schematic diagram of another document annotation system.

FIG. 17 shows a further modification to the document annotation system shown in FIG. 15. In the embodiment shown in FIG. 17, the input document is received by a facsimile unit 115 rather than a scanner 103. The image data output by the facsimile unit is then processed in the same manner as the image data output by the scanner 103 shown in FIG. 15, and will not be described again.

In the above embodiment, a phonetic transcription unit 107 was used for generating the annotation data for annotating the image or text data. As those skilled in the art will appreciate, other techniques can be used. For example, a human operator can manually generate this annotation data from the image of the document itself.

Figure 18:
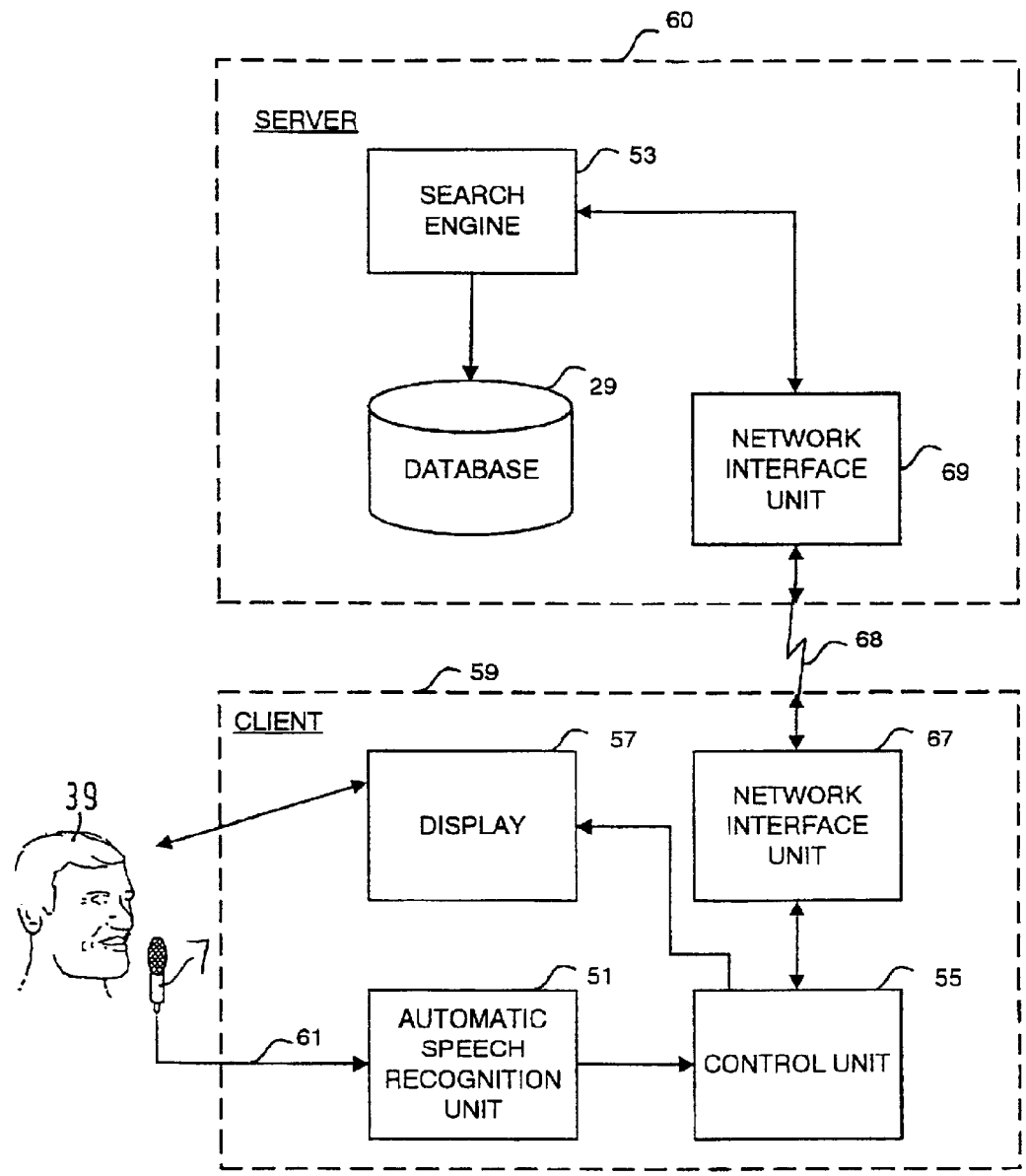
FIG. 18 is a schematic block diagram illustrating a user terminal which is operable to access a database located on a remote server via a data network in response to an input utterance by the user.

In the above embodiment, the database 29 and the automatic speech recognition unit were both located within the user terminal 59. As those skilled in the art will appreciate, this is not essential. FIG. 18 illustrates an embodiment in which the database 29 and the search engine 53 are located in a remote server 60 and in which the user terminal 59 accesses and controls data files in the database 29 via the network interface units 67 and 69 and a data network 68 (such as the Internet). In operation, the user inputs a voice query via the microphone 7 which is converted into phoneme and word data by the automatic speech recognition unit 51. This data is then passed to the control unit which controls the transmission of this phoneme and word data over the data network 68 to the search engine 53 located within the remote server 60. The search engine 53 then carries out the search in accordance with the received phoneme and word data or controls the manipulation of the data files (for example to control the playing, forwarding or rewinding of a video file) in accordance with the received phoneme and word data. The data retrieved from the database 29 or other data relating to the search is then transmitted back, via the data network 68, to the control unit 55 which controls the display of appropriate data on the display 57 for viewing by the user 39. In this way it is possible to retrieve and control data files in the remote server 60 without using significant computer resources in the server (since it is the user terminal 59 which converts the input speech into the phoneme and word data).

Figure 19:
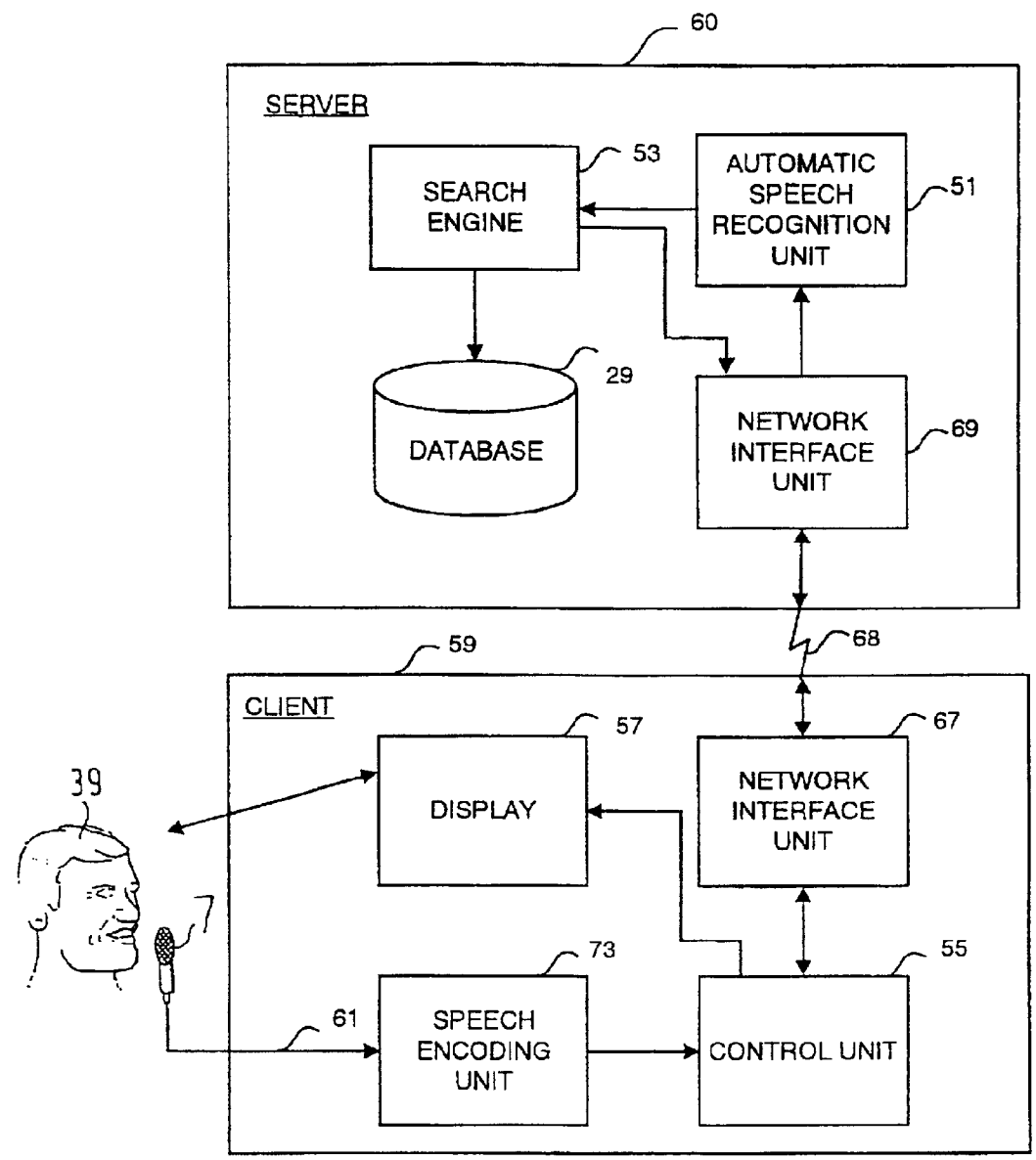
FIG. 19 is a schematic block diagram of a user terminal which allows a user to access a database located in a remote server in response to an input utterance from the user.

In addition to locating the database 29 and the search engine 53 in the remote server 60, it is also possible to locate the automatic speech recognition unit 51 in the remote server 60. Such an embodiment is shown in FIG. 19. As shown in this embodiment, the input voice query from the user is passed via input line 61 to a speech encoding unit 73 which is operable to encode the speech for efficient transfer through the data network 68. The encoded data is then passed to the control unit 55 which transmits the data over the network 68 to the remote server 60, where it is processed by the automatic speech recognition unit 51. The phoneme and word data generated by the speech recognition unit 51 for the input query is then passed to the search engine 53 for use in searching and controlling data files in the database 29. Appropriate data retrieved by the search engine 53 is then passed, via the network interface 69 and the network 68, back to the user terminal 59. This data received back from the remote server is passed via the network interface unit 67 to the control unit 55 which generates and displays appropriate data on the display 57 for viewing by the user.

Figure 20:
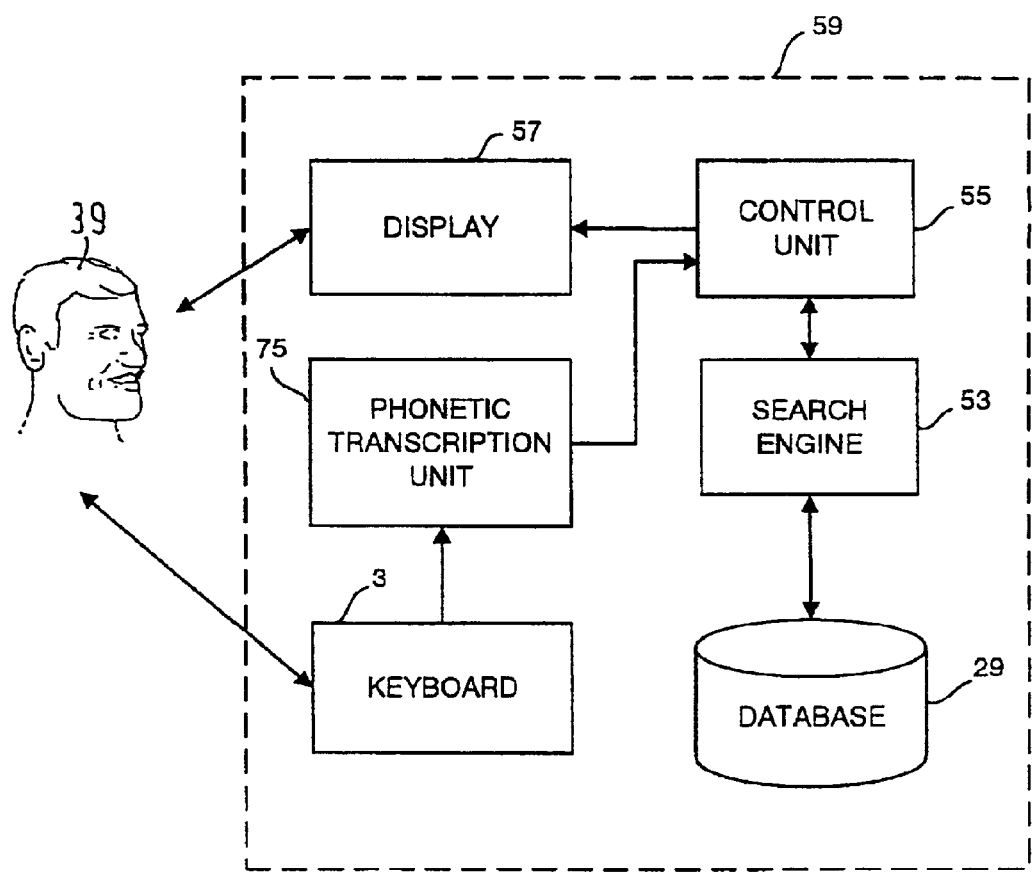
FIG. 20 is a schematic block diagram of a user terminal which allows a user to access a database by a typed input query.

In the above embodiments, the user inputs his query by voice. FIG. 20 shows an alternative embodiment in which the user inputs the query via the keyboard 3. As shown, the text input via the keyboard 3 is passed to phonetic transcription unit 75 which is operable to generate a corresponding phoneme string from the input text. This phoneme string together with the words input via the keyboard 3 are then passed to the control unit 55 which initiates a search of database using the search engine 53. The way in which this search is carried out is the same as in the first embodiment and will not, therefore, be described again. As with the other embodiments discussed above, the phonetic transcription unit 75, search engine 53 and/or the database 29 may all be located in a remote server.

Figure 21:
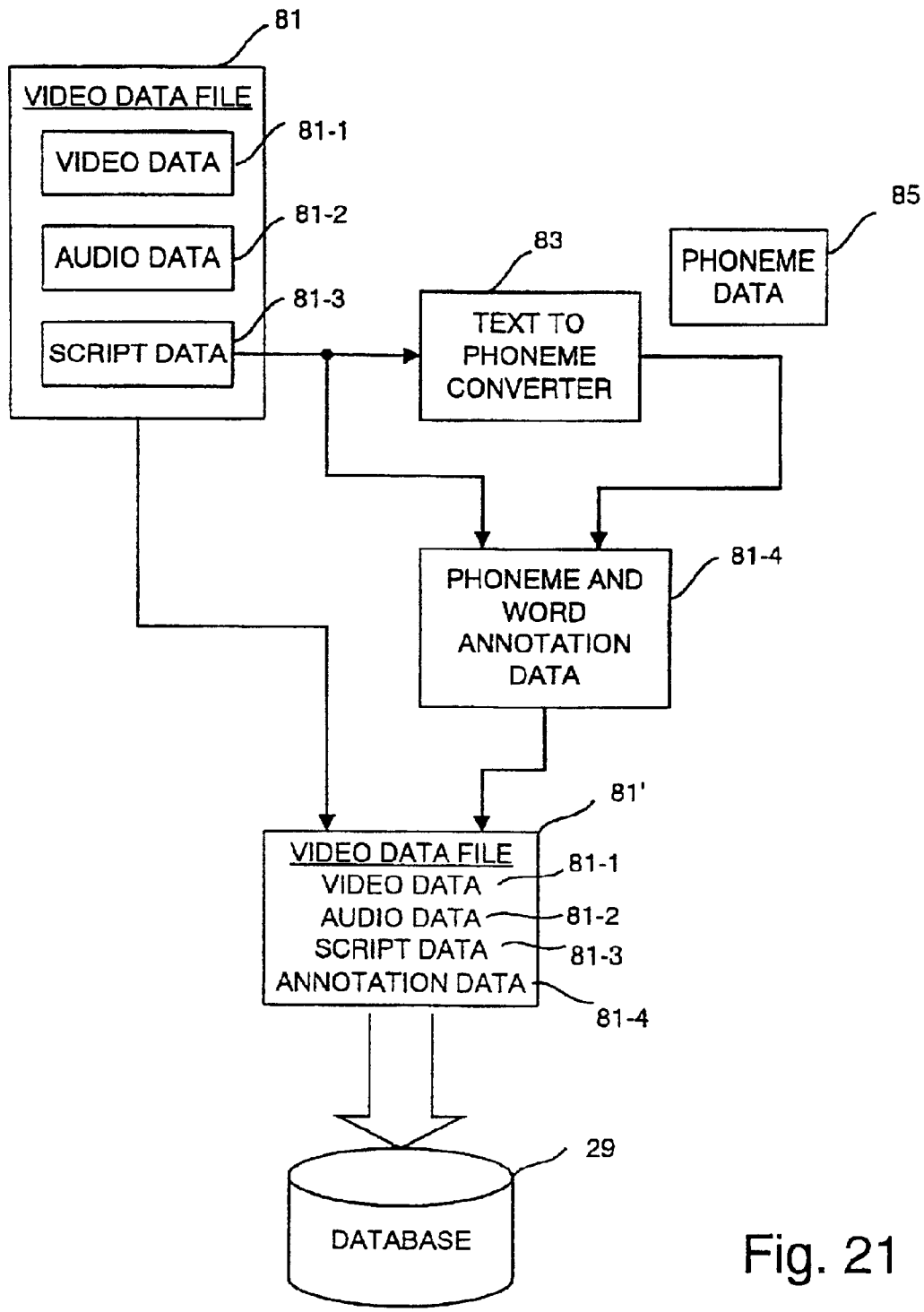
FIG. 21 is a schematic block diagram illustrating the way in which a phoneme and word lattice can be generated from script data contained within a video data file.

In the first embodiment, the audio data from the data file 31 was passed through an automatic speech recognition unit in order the generate the phoneme annotation data. In some situations, a transcript of the audio data will be present in the data file. Such an embodiment is illustrated in FIG. 21. In this embodiment, the data file 81 represents a digital video file having video data 81-1, audio data 81-2 and script data 81-3 which defines the lines for the various actors in the video film. As shown, the script data 81-3 is passed through a text to phoneme converter 83, which generates phoneme lattice data 85 using a stored dictionary which translates words into possible sequences of phonemes. This phoneme lattice data 85 is then combined with the script data 81-3 to generate the above described phoneme and word lattice annotation data 81-4. This annotation data is then added to the data file 81 to generate an augmented data file 81' which is then added to the database 29. As those skilled in the art will appreciate, this embodiment facilitates the generation of separate phoneme and word lattice annotation data for the different speakers within the video data file, since the script data usually contains indications of who is talking. The synchronisation of the phoneme and word lattice annotation data with the video and audio data can then be achieved by performing a forced time alignment of the script data with the audio data using an automatic speech recognition system (not shown).

In the above embodiments, a phoneme (or phoneme-like) and word lattice was used to annotate a data file. As those skilled in the art of speech recognition and speech processing will realise, the word "phoneme" in the description and claims is not limited to its linguistic meaning but includes the various sub-word units that are identified and used in standard speech recognition systems.

What is claimed is:

1. An apparatus for generating annotation data for annotating a data file comprising audio data, the apparatus comprising:
   an automatic speech recognizer operable to generate phoneme data for audio data in the data file;
   a word decoder operable to process the phoneme data generated by the automatic speech recognizer to identify words within the phoneme data;

an annotation generator operable to generate annotation data for the data file by combining the generated phoneme data and the words identified by said word decoder, the annotation data being for use in subsequent retrieval of the data file;

an associator operable to associate the generated annotation data with the data file; and a storage device operable to store the annotation data in a database to allow the associated data file to be retrieved by searching for words and phonemes within the stored annotation data.

2. An apparatus according to claim 1, wherein the annotation data defines a phoneme and word lattice and wherein said annotation generator comprises:

(i) a first generator operable to generate data defining a plurality of nodes within the lattice and a plurality of links connecting the nodes within the lattice;

(ii) a second generator operable to generate data associating a plurality of phonemes of the phoneme data with a respective plurality of links; and (iii) a third generator operable to generate data associating at least one of the words with at least one of the links.

3. An apparatus according to claim 2, wherein said annotation generator is operable to generate the data defining the phoneme and word lattice in blocks of the nodes.

4. An apparatus according to claim 3, wherein said annotation generator is operable to generate data which defines each block's location within the database.

5. An apparatus according to claim 2, wherein said annotation generator is operable to generate data defining time stamp information for each of the nodes.

6. An apparatus according to claim 5, wherein said annotation generator is operable to generate the phoneme and word lattice data in blocks of equal time duration.

7. An apparatus according to claim 5, wherein said data file includes a time sequential signal, and wherein said annotation generator is operable to generate time stamp data which is time synchronized with the time sequential signal.

8. An apparatus according to claim 2, wherein said first generator is operable to define at least one node which is connected to a plurality of other nodes by a plurality of links.

9. An apparatus according to claim 1, wherein the data file includes audio data which defines the speech of a plurality of speakers, and wherein said annotation generator is operable to generate data which defines separate phoneme and word annotation data for the speech of each speaker.

10. An apparatus according to claim 1, wherein said speech recognizer is operable to generate data defining a weighting for phonemes in the phoneme data.

11. An apparatus according to claim 1, wherein said word decoder is operable to generate data defining a weighting for the words identified within the phoneme data.

12. An apparatus according to claim 1, wherein said annotation generator is operable to generate annotation data that defines a phoneme and word lattice arranged in a time-ordered sequence of blocks.

13. An apparatus according to claim 12, wherein the phoneme and word lattice is associated with a time-sequential signal, and wherein said annotation generator is operable to generate the phoneme and word lattice so that:

(i) the time-ordered sequence of blocks of the phoneme and word lattice is time-synchronized with the time-sequential signal; and (ii) each block of the phoneme and word lattice includes an associated time index identifying a timing of the block within the time-sequential signal.

14. An apparatus according to claim 13, wherein said annotation generator is operable to generate node data which defines a plurality of nodes within the lattice, each node representing a point in time at which a word and/or phoneme begins or ends within the associated time-sequential signal and wherein each node includes a time-offset value defining the point in time represented by the node relative to the time index associated with the corresponding block.

15. An apparatus according to claim 1, wherein said automatic speech recognizer is operable to generate phoneme data that includes a phoneme lattice which identifies a number of different possible phoneme strings which correspond to speech within the audio data, and wherein said annotation generator is operable to generate the annotation data by combining the generated phoneme lattice with the words identified by said word decoder.

16. An apparatus according to claim 1, wherein said annotation generator is operable to generate header data relating to the speech recognizer that generated the phoneme data for the annotation.

17. An apparatus according to claim 16, when said annotation generator is operable to generate header data including data identifying the language and the phoneme sets used by said automatic speech recognizer.

18. An apparatus for generating annotation data for annotating a data file, the apparatus comprising;

an input operable to receive an input voice signal;

a speech recognizer operable (i) to convert the input voice signal into phoneme data and (ii) to process the phoneme data to identify words within the phoneme data;

an annotation generator operable to generate annotation data for the data file by combining the phoneme data and the words obtained by said speech recognizer, the annotation data being for use in subsequent retrieval of the data file;

an associator operable to associate the generated annotation data with the data file; and a storage device operable to store the annotation data in a database to allow the associated data file to be retrieved by searching for words and phonemes within the stored annotation data.

19. An apparatus according to claim 18, wherein said speech recognizer is operable to generate data defining a weighting for phonemes in the phoneme data.

20. An apparatus according to claim 19, wherein said speech recognizer is operable to generate data defining a weighting for the words.

21. An apparatus according to claim 18, wherein said speech recognizer is operable to generate phoneme data that includes a phoneme lattice which identifies a number of different possible phoneme strings which correspond to speech within the input voice signal, and wherein said annotation generator is operable to generate the annotation data by combining the generated phoneme lattice with the words identified by said speech recognizer.

22. An apparatus according to claim 18, wherein said annotation generator is operable to generate header data relating to the speech recognizer that generated the phoneme data for the annotation.

23. An apparatus according to claim 22, wherein said annotation generator is operable to generate header data including data identifying the language and the phoneme sets used by said speech recognizer.

24. An apparatus for generating annotation data for annotating a data file, the apparatus comprising:

an input operable to receive image data representative of text;

a character recognizer operable to convert the image data into text data;

a converter operable to convert words in the text data into phoneme data; and an annotation generator operable to generate annotation data for the data file by combining the phoneme data and words in the text data, the annotation data being for use in subsequent retrieval of the data file;

an associator operable to associate the generated annotation data with the data file; and a storage device operable to store the annotation data in a database to allow the associated data file to be retrieved by searching for words and phonemes within the stored annotation data.

25. An apparatus according to claim 24, wherein said converter comprises an automatic phonetic transcription unit which generates the phoneme data from words within the text data output by said character recognizer.

26. An apparatus according to claim 24, wherein said input comprises a document scanner or a facsimile machine.

27. A method of generating annotation data for annotating a data file comprising audio data, the method comprising the steps of:

using an automatic speech recognizer to generate phoneme data for audio data in the data file;

using a word decoder to process the phoneme data generated by the automatic speech recognizer to identify words within the phoneme data;

generating annotation data for the data file by combining the generated phoneme data and the words identified by the word decoder, the annotation data being for use in subsequent retrieval of the data file;

associating the generated annotation data with the data file; and storing the annotation data in a database to allow the associated data file to be retrieved by searching for words and phonemes within the stored annotation data.

28. A method according to claim 27, wherein the annotation data defines a phoneme and word lattice and wherein said step of generating annotation data comprises the steps of:

(i) generating data defining a plurality of nodes within the lattice and a plurality of links connecting the nodes within the lattice;

(ii) generating data associating a plurality of phonemes of the phoneme data with a respective plurality of links; and (iii) generating data associating at least one of the words with at least one of the links.

29. A method according to claim 28, wherein said step of generating annotation data generates data defining time stamp information for each of the nodes.

30. A method according to claim 29, wherein said step of generating annotation data generates data which defines a block's location within a database.

31. A method according to claim 29, wherein the data file includes a time sequential signal, and wherein said step of generating annotation data generates time stamp data which is time synchronized with the time sequential signal.

32. A method according to claim 28, wherein the speech recognizer generates data defining a weighting for the phonemes associated with the links.

33. A method according to claim 28, wherein the word decoder generates data defining a weighting for the words associated with the links.

34. A method according to claim 28, wherein said step of defining a plurality of nodes and a plurality of links defines at least one node which is connected to a plurality of other nodes by a plurality of links.

35. A method according to claim 28, wherein said step of generating annotation data generates data defining the phoneme and word lattice in blocks of the nodes.

36. A method according to claim 27, wherein the audio data includes audio data which defines the speech of a plurality of speakers, and wherein said generating step generates data which defines separate phoneme and word annotation data for the speech of each speaker.

37. A method of generating annotation data for annotating a data file, the method comprising the steps of:

receiving an input voice signal;

processing the input voice signal using a speech recognizer to generate phoneme data for the input voice signal;

processing the generated phoneme data to identify words within the phoneme data;

generating annotation data by combining the phoneme data and the word data generated for the input voice signal, the annotation data being for use in subsequent retrieval of the data file;

associating the generated annotation data with the data file; and storing the annotation data in a database to allow the associated data file to be retrieved by searching for words and phonemes within the stored annotation data.

38. A method according to claim 37, wherein the speech recognizer generates data defining a weighting for the generated phoneme data.

39. A method according to claim 37, wherein said step of processing the generated phoneme data generates data defining a weighting for the words identified within the phoneme data.

40. A method of generating annotation data for use in annotating a data file, the method comprising the steps of:

receiving image data representative of text;

converting the image data into text data using a character recognizer;

converting words in the text data into phoneme data;

generating annotation data for the data file by combining the phoneme data and words within the text data, the annotation data being for use in subsequent retrieval of the data file;

associating the generated annotation data with the data file; and storing the annotation data in a database to allow the associated data file to be retrieved by searching for words and phonemes within the stored annotation data.

41. A method according to claim 40, wherein said step of converting words into phoneme data uses an automatic phonetic transcription unit which generates the phoneme data for words within the text data output by the character recognizer.

42. A method according to claim 40, wherein said receiving step uses a document scanner or a facsimile machine.

43. A computer readable medium storing computer program code for causing a programmable processing apparatus to become operable to generate annotation data for annotating a data file comprising audio data, the computer readable medium comprising:

code for causing an automatic speech recognizer to generate phoneme data for audio data in the data file;

code for causing a word decoder to process the phoneme data generated by the automatic speech recognizer to identify words within the phoneme data;

code for generating annotation data for the data file by combining the generated phoneme data and the words identified by the word decoder, the annotation data being for use in subsequent retrieval of the data file;

code for associating the generated annotation data with the data file; and code for storing the annotation data in a database to allow the associated data file to be retrieved by searching for words and phonemes within the stored annotation data.

44. A computer readable medium storing computer executable instructions for causing a programmable processing apparatus to become operable to generate annotation data for annotating a data file, the medium comprising:

code for receiving an input voice signal;

code for causing an automatic speech recognizer to convert the input voice signal into phoneme data;

code for processing the phoneme data to identify words within the phoneme data;

code for generating annotation data by combining the generated phoneme data and the identified words, the annotation data being for use in subsequent retrieval of the data file;

code for associating the generated annotation data with the data file; and code for storing the annotation data in a database to allow the associated data file to be retrieved by searching for words and phonemes within the stored annotation data.

45. A computer readable medium storing computer executable instructions for causing a programmable processing apparatus to become operable to generate annotation data for annotating a data file, the medium comprising:

code for receiving image data representative of text;

code for converting the image data into text data using a character recognizer;

code for converting words in the text data into phoneme data;

code for generating annotation data for the data file by combining the phoneme data and words within the text data, the annotation data being for use in subsequent retrieval of the data file;

code for associating the generated annotation data with the data file; and code for storing the annotation data in a database to allow the associated data file to be retrieved by searching for words and phonemes within the stored annotation data.

46. An apparatus for generating annotation data for use in annotating a data file comprising audio data, the apparatus comprising:

an automatic speech recognizer operable to generate phoneme data for audio data in the data file;

a word decoder operable to identify words within the phoneme data generated by said automatic speech recognizer; and an annotation generator operable to generate annotation data by combining the generated phoneme data and the words identified by said word decoder and operable to generate header data relating to the speech recognizer that generated the phoneme data for the annotation, which header data includes data identifying the language and phoneme set used by said automatic speech recognizer.

47. An apparatus for generating annotation data for use in annotating a data file, the apparatus comprising:

an input operable to receive an input voice signal;

a speech recognizer operable to convert the input voice signal into phoneme data and words; and an annotation generator operable to generate annotation data by combining the phoneme data and the words and operable to generate header data relating to the speech recognizer that generated the phoneme data for the annotation, which header data includes data identifying the language and the phoneme set used by the speech recognizer.

* * * * *

UNITED STATES PATENT AND TRADEMARK OFFICE
CERTIFICATE OF CORRECTION

PATENT NO. : 6,990,448 B2  Page 1 of 1
APPLICATION NO. : 09/934799
DATED : January 24, 2006
INVENTOR(S) : Jason Peter Andrew Charlesworth et al.

It is certified that error appears in the above-identified patent and that said Letters Patent is hereby corrected as shown below:

ON THE COVER PAGE
At Item (56), Other Publications, page 2, "((Oct. 1993)." should read --(Oct. 1993).--.
At Item (56), Other Publications, page 2, "Haeb-Embach," should read
    --Haeb-Umbach,--.
At Item (56), Other Publications, page 3, after "Kenney Ng," second listing, "Sections 1,
    2, 8" should read --Sections 1, 2, 6--.
At Item (56), Other Publications, page 3, after "Steve Cassidy," "Adalaide," should read
    --, Adelaide,--.
At Item (57), Abstract, line 4, "an annotation" should be deleted.
At Item (57), Abstract, line 12, "asociated" should read --associated--.

COLUMN 3
Line 53, "to be able" should be deleted.

COLUMN 5
Line 29, "k=0,1,2, ... offset" should read --k=0,1,2 ... ¶offset--.
Line 34, "l=0,1,2 ... offset" should read --l=0,1,2 ... ¶offset--.
Line 37, "block (i)) word" should read --block (i)) ¶word--.

COLUMN 12
Line 27, "the generate" should read --to generate--.

COLUMN 14
Line 25, "comprising;" should read --comprising:--.

Signed and Sealed this

Twenty-sixth Day of September, 2006

JON W. DUDAS
*Director of the United States Patent and Trademark Office*